United States Patent [19]

Topolkaraev et al.

[11] Patent Number: 5,968,643

[45] Date of Patent: Oct. 19, 1999

[54] MICROPOROUS FILM WITH IMPROVED PROPERTIES

[75] Inventors: Vasily Aramovich Topolkaraev; Fu-Jya Tsai, both of Appleton, Wis.

[73] Assignee: Kimberly-Clark Worldwide, Inc., Neenah, Wis.

[21] Appl. No.: 08/931,574

[22] Filed: Sep. 16, 1997

[51] Int. Cl.$^6$ .......................................... B32B 3/26
[52] U.S. Cl. ................................ 428/305.5; 428/315.7; 428/317.9; 521/76; 521/142; 521/905; 521/911
[58] Field of Search ...................... 428/305.5, 315.5, 428/315.7, 317.9; 521/76, 91, 92, 98, 142, 143, 905, 911

[56] References Cited

U.S. PATENT DOCUMENTS

| | | | |
|---|---|---|---|
| 3,929,509 | 12/1975 | Taskier | 136/146 |
| 4,350,655 | 9/1982 | Hoge | 264/145 |
| 4,698,372 | 10/1987 | Moss | 521/145 |
| 4,705,812 | 11/1987 | Ito et al. | 521/92 |
| 4,814,124 | 3/1989 | Aoyama et al. | 264/41 |
| 4,921,653 | 5/1990 | Aoyama et al. | 264/41 |
| 5,008,296 | 4/1991 | Antoon, Jr. et al. | 521/91 |
| 5,766,760 | 6/1998 | Tsai et al. | 428/376 |
| 5,800,758 | 9/1998 | Topolkaraev et al. | 264/154 |

FOREIGN PATENT DOCUMENTS

| | | |
|---|---|---|
| 0 129 420 A2 | 12/1984 | European Pat. Off. . |
| 0 253 667 A3 | 1/1988 | European Pat. Off. . |
| WO 97/39169 A1 | 10/1997 | WIPO . |

OTHER PUBLICATIONS

American Society for Testing Materials (ASTM) Designation: D 1238–95, "Standard Test Method for Flow Rates of Thermoplastics by Extrusion Plastometer," pp. 273–281, published Jan. 1996.

American Society for Testing Materials (ASTM) Designation: E 96–80, "Standard Test Methods for Water Vapor Transmission of Materials," pp. 742–751, published Feb. 1981.

Dullien, F. A. L., "Porous Media: Fluid Transport and Pore Structure," Academic Press, New York, 1979, pp. 78–83.

Germani, Mark S., "Application of Automated Electron Microscopy to Individual Particle Analysis," *American Laboratory*, vol. 25, No. 7, Apr. 1993, pp. 17–24.

Nakamura, Shunichi, et al., "Microporous Polypropylene Sheets," *Industrial & Engineering Chemistry Research*, American Chemical Society, vol. 32, 1993, pp. 221–227.

Nakamura, Shunichi, et al., "Microporous Polypropylene Sheets Containing CaCo3 Filler," *Journal of Applied Polymer Science*, vol. 49, No. 1, 1993, pp. 143–150.

Vander Wood, T. B., "Introduction to Automated Particle Analysis," Proceedings of 52nd Annual Meeting of Microscopy Society of America—New Orleans—Jul. 31–Aug. 5, 1994, pp. 398–399.

*Primary Examiner*—Blaine R. Copenheaver
*Attorney, Agent, or Firm*—Paul Yee

[57] ABSTRACT

A microporous, hydrophilic polymer film has a morphology composed of distinctively interconnected pores, which are desirably surface-open. In particular aspects, the film can provide for a water vapor transmission rate (WVTR) value of at least about 1000 grams per square meter per 24 hours per mil (0.00254 cm) of film thickness. The film can exhibit a modulus of not less than about 1 MPa, and may also exhibit an elongation strain at break of at least about 100% in both its machine and transverse directions. The film can also provide for a water contact angle of not more than about 80 degrees. In other aspects, the porous film can also include other properties or characteristics, such as a desired tensile strength at break, a desired elongation-at-break, and voids or pores having distinctive shapes, sizes, distributions and configurations.

25 Claims, 13 Drawing Sheets

5,968,643

MICROPOROUS FILM WITH IMPROVED PROPERTIES

FIELD OF THE INVENTION

The present invention relates to polymer layers. More particularly, the invention relates to synthetic polymer, porous films which are wettable and which exhibit improved mechanical properties.

BACKGROUND OF THE INVENTION

Polyolefins, such as polyethylene and polypropylene-based films and nonwovens, have been widely used as structural components of disposable personal care products. Polyolefins provide many functional benefits, such as low cost, improved processability, and a broad range of grades having tailored melt and solid state properties. Conventional polyolefins, however, are hydrophobic and do not provide a desired water responsive functionality.

Porous materials can be made by a variety of conventional techniques. For example, conventional phase separation methods have involved a mixing of a polymer resin with diluent or plasticizer, a quenching the polymer blend to induce phase separation, and a washing away of the diluent to leave a developed porous structure. The morphology of the porous structure can mainly depend on the type and amount of the diluent, the mixing efficiency and the washing technique. Other techniques have involved a multi-step stretching of polymer films, environmental crazing, and an addition of a blowing or swelling agent to create the microporous structure. Conventional techniques, such as those described above, however, have been limited in their ability to control the microporous morphology and the properties of the material. The techniques have also been unable to produce microporous films at a sufficiently high speed, and have not been adequately cost efficient for producing materials having desired physical and performance characteristics.

Porous films have been also made by incorporating filler particles into a polymer material and stretching the material to form a film with the voids induced by the filler. Technologies based upon the incorporation of filler particles introduces a range of variables, such as the type of filler, the amount of filler, the filler particle size and size distribution, any surface-modifications made to the filler particles, the mode or method of stretching the film, and the like. Each of these factors can affect the morphology and properties of the porous film.

Conventional porous films, such as those described above, have not been able to provide desired combinations of mechanical properties and water accessibility. In addition, the techniques have not adequately produced porous films having desired combinations of high wettability, high permeability to liquid, and high tensile strength. As a result, there has been a continuing need for polymer films, such as polyolefin-based films, having improved porous structures, such as porous films can have a microstructure which provides rapid water access into the material systems, can have high flexibility and low friction for flushability, and can have high strength, durability and softness to provided desired levels of in-use performance.

BRIEF DESCRIPTION OF THE INVENTION

Generally stated, the present invention provides a distinctive porous film which comprising a polymer film material having an interconnected porous morphology. The film can provide for a particular combination of water vapor transmission rate (WVTR), wettability and physical characteristics, such as strength and flexibility.

In particular aspects of the invention, the film can provide for a minimum first tensile strength value with respect to a first major direction of the film, and can provide for a minimum elongation-at-break value with respect to the first major direction. In other aspects of the invention, the film can have an interconnected porous morphology includes a lattice of said polymer material which delimits a plurality of voids having distinctive pore sizes, and can exhibit a surface-open-interconnected porous morphology comprising a plurality of pores distributed through a thickness dimension of said film. Further aspects of the invention can provide a porous polymer film wherein the interconnected porous morphology includes a polymer lattice which delimits a plurality of voids which open onto a major facing surface of the film and provide distinctive amounts of open pore area on the major facing surface.

Due to its various aspects, the porous film of the invention can effectively and efficiently provide films having desired combinations of high wettability, high water-accessibility, high permeability to gases and vapors, high tensile strength, high elongation, low modulus, and improved durability, flexibility and softness. As a result, the various aspects of the invention can provide films having an improved microporous structure, and can provide films having properties tailored for particular flushable applications. In addition, the film can have an improved ability to be further processed to form desired articles of manufacture.

BRIEF DESCRIPTION OF THE DRAWINGS

The present invention will be more fully understood and further advantages will become apparent when reference is made to the followed detailed description of the invention and the drawings, in which.

DETAILED DESCRIPTION OF THE INVENTION

Figure 5:
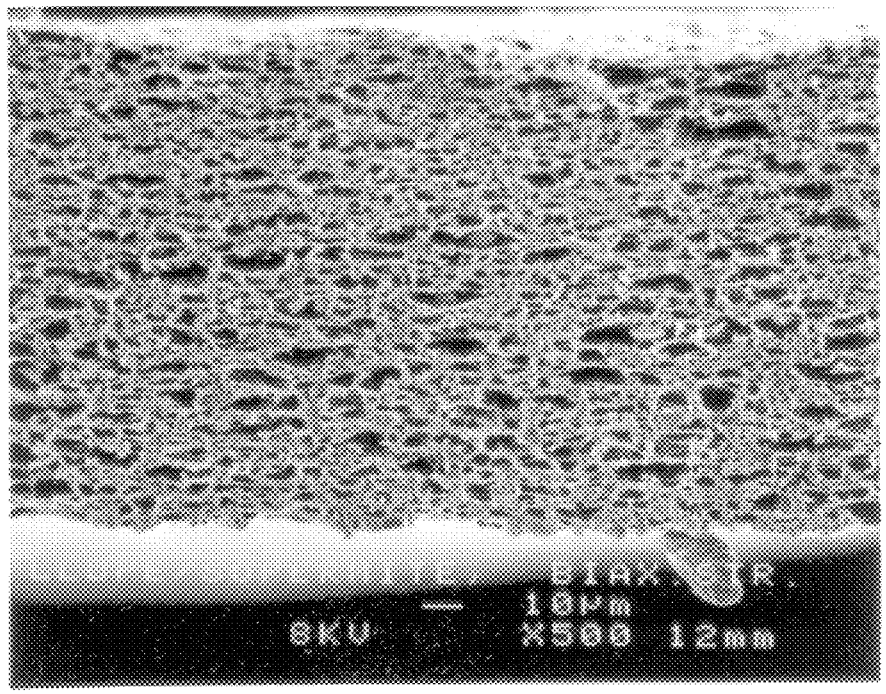
FIG. 5 is a scanning electron photomicrograph, taken at a magnification of 500 X, showing a representative cross-sectional view of a porous film of the invention.
Figure 6:
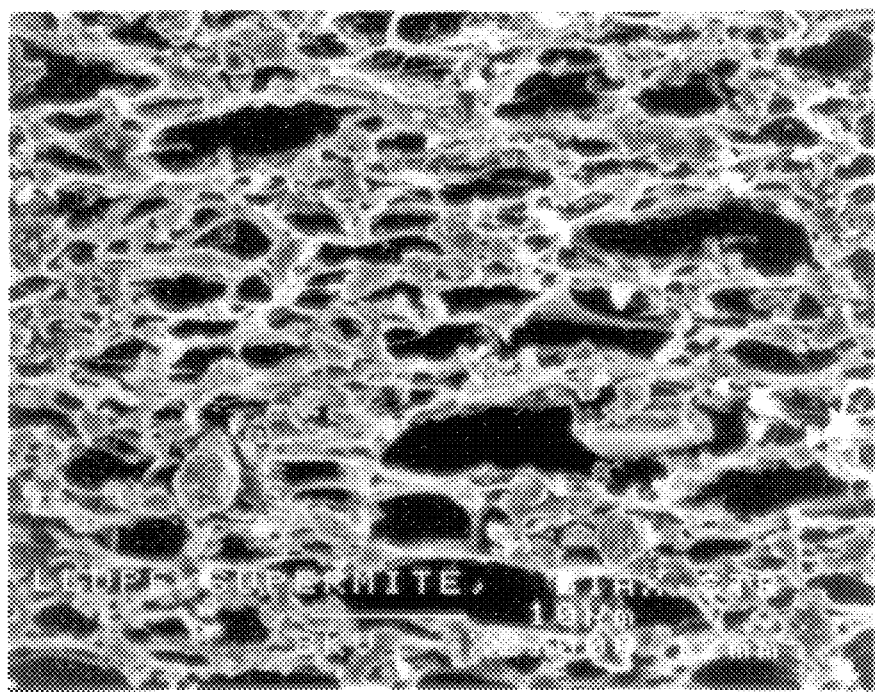
FIG. 6 is a scanning electron photomicrograph, taken at a magnification of 2,000 X, showing an enlarged view of the cross-section shown in FIG. 5.
Figure 7:
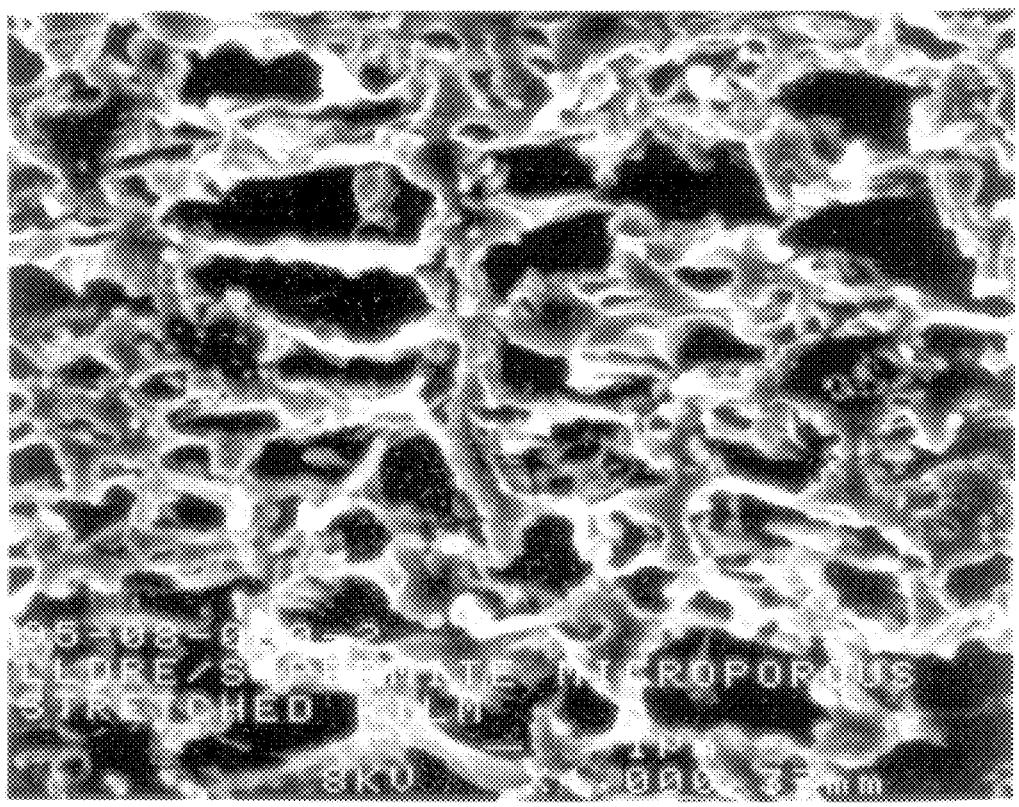
FIG. 7 is a scanning electron photomicrograph, taken at a magnification of 4,000 X, showing a further enlarged view of the cross-section shown in FIG. 5.
Figure 8:
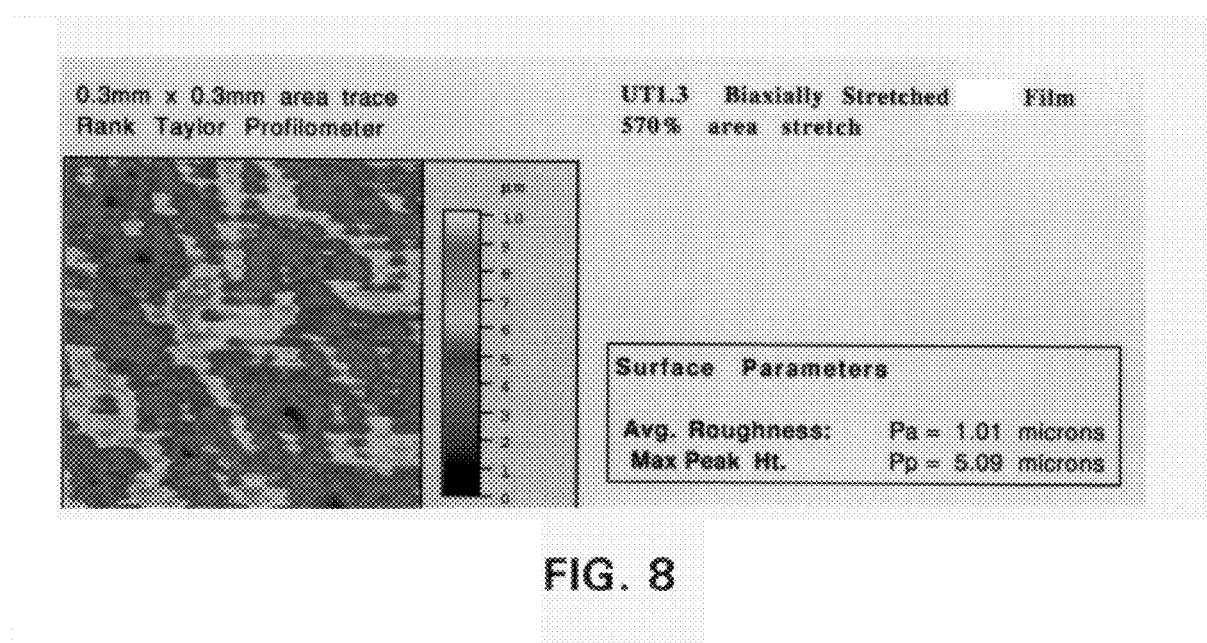
FIG. 8 shows a representative, surface microtopography of a porous film of the invention.
Figure 9:
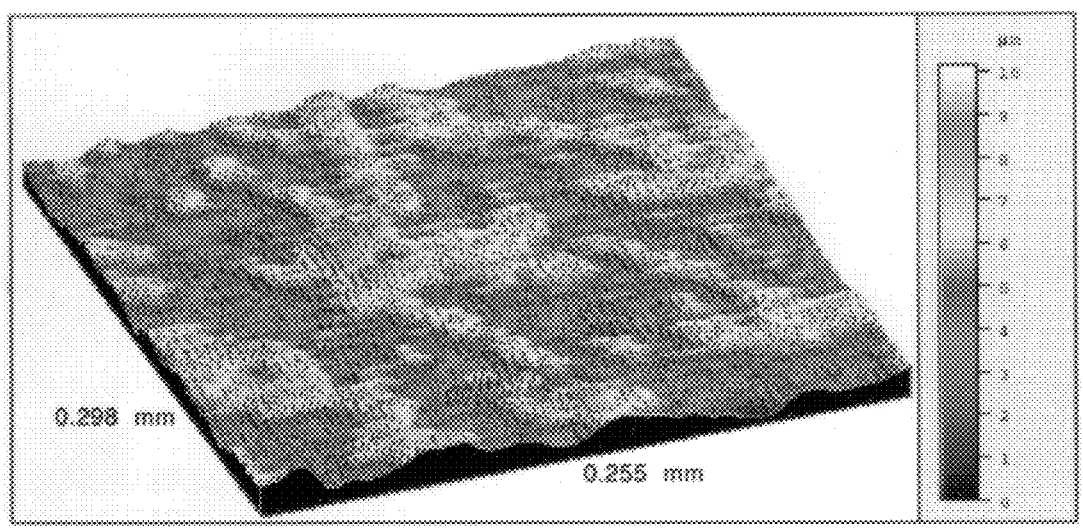
FIG. 9 shows a representative, perspective view of the surface microtopography illustrated in FIG. 8.
Figure 10:
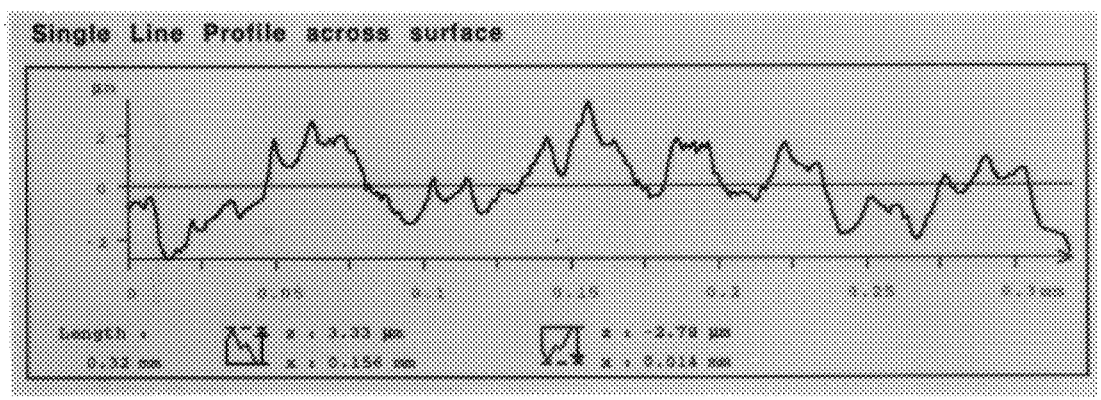
FIG. 10 shows a representative single line profile trace of the surface microtopography illustrated in FIG. 8.

With reference to FIGS. 1, 2, 3, and 4, a porous film 20 includes a first major length-wise dimension or direction 44, and a second, generally cross-wise, major dimension or direction 38 which is substantially perpendicular to the first dimension 44. The film also has a third dimension or direction which extends along the bulk thickness of the film and is substantially perpendicular to the first and second major directions 44 and 38, as illustrated by FIGS. 5 and 6. The material of the porous film has a distinctive configuration of voids or pores 22 therein to achieve desired levels and combinations of wettability, liquid penetration and other parameters of liquid accessibility, particularly with respect to water. The film can have a thickness of not more than about 1 mm, and can desirably include a polymer material having a morphology composed of distinctively interconnecting pores. In particular aspects, the film can provide a minimum water vapor transmission rate (WVTR) value of at least about 1000 grams per square meter per 24 hours per mil (0.00254 cm) of film thickness, and desirably, at least about 1500 grams per square meter per 24 hours per mil of film thickness. In addition, the modulus of the film can be not less than about 1 MPa. The film has an opposed pair of major, outer facing surfaces 34. At least one of the facing surfaces is substantially hydrophilic, is readily wettable to provide a water contact angle of not more than about 80 degrees, and is readily accessible to significant levels of water penetration. In particular aspects, the porous film can have a plurality of surface-open pores, and can provide an interconnected porous morphology. In further aspects of the invention, the porous film 20 can also include other properties, such as a desired tensile strength at break and elongation-at-break, and can include voids or pores having distinctive shapes, sizes, distributions and configurations.

In its various aspects, the microporous film of the invention can provide for improved wicking can more quickly bring water or other liquid into the interior of a fibrous article, and can accelerate the dissolution kinetics for articles which are intended to be flushable. In addition, the microporous film can help provide for improved absorbency, improved distribution of liquid, improved breathability in articles, such as surgical gowns and diapers, improved tactile and aesthetic properties, enhanced biodegradability, and/or an improved ability to be flushed down an ordinary, conventional toilet. The films may, for example, be particularly useful for producing flushable personal care products, such as diapers, training pants, tampons, feminine pads, pantiliners, and the like.

It has been found that it can be important to provide wettability not only on the surface of the film but also within the porous or microporous channel structure to provide a driving force for liquid flow into intrinsic, internal regions of the material. A major factor which can affect the access of liquid (e.g. water) into the microporous film structure can include the specific permeability of the film material, as determined by the pore geometry (pore size and size distribution) and by the connectivity and tortuosity of the three-dimensional pore structure. Other major factors can include the liquid viscosity, the liquid surface tension, the contact angle of liquid with microporous media, and the thickness of the material. As a result, it is desirable to have porous film materials which provide specific microporous structures with controlled liquid permeability and provide for particular interactions between the liquid with the microporous structure. Such interactions can, for example, be produced by reducing or otherwise affecting the liquid viscosity and surface tension.

The various configurations of the present invention, can provide a synthetic porous film 20 composed of a film material which is produced from a source material. The source material can include a thermoplastic, orientable material, such as thermoplastic and orientable polymers, copolymers, blends, mixtures, compounds and other combinations thereof. Desirably, the thermoplastic materials do not include highly reactive groups. In particular arrangements of the invention, the source material can be a polyolefinic material. For example, the source material may include homopolymers of polyethylene or polypropylene, or may include copolymers of ethylene and polypropylene. In other arrangements, the source material may include another polymer material, such as a polyether, a copolyether, a polyamid, a copolyamid, a polyester or a copolyester, as well as copolymers, blends, mixtures and other combinations thereof.

The thermoplastic material is desirably melt processible, and in particular aspects of the invention, the material can have a minimum melt flow rate (MFR) value of not less than about 0.2 g/10 minutes (based on ASTM D1238). Alternatively, the MFR value can be not less than about 0.4 g/10 minutes, and optionally, can be not less than about 0.8 g/10 minutes. In other aspects of the invention, the MFR value can have a maximum of not more than 100 g/10 minutes. Alternatively, the MFR value can be not more than about 50 g/10 minutes, and optionally, can be not more than about 20 g/10 minutes to provide desired levels of processibility.

Such melt processible, thermoplastic polymeric material is also stretchable in its solid state to allow a stretch processing of the filled film. The selection of the polymer to achieve the desired solid state performance can include a consideration of the ratio between true tensile fracture stress (tensile force at failure divided by the cross-sectional area of the failed specimen), $\sigma_F$, and the stress at yielding, $\sigma_Y$. In particular aspects of the invention, the ratio or quotient between the true tensile strength and the yield strength ($\sigma_F/\sigma_Y$) is desirably not less than 1, and alternatively is not less than 5. Optionally, the ratio between the true tensile strength and the yield stress is not less than 10. In other aspects of the invention, the ratio between the true tensile strength and yield strength can be not more than 150, and alternatively can be not more than about 100. Optionally, the ratio between true tensile strength and yield stress can be not more than about 50.

Examples of suitable melt processible, thermoplastic materials which allow an appropriate drawing in their solid state can be provided by a homopolymer polyethylene and copolymers of ethylene and $C_4$–$C_8$ α-olefin monomer. Particularly useful examples are known as "super-octene" resins. The "super-octene" resins can include the linear low density polyethylene (LLDPE) resins that are produced by the polymerization of ethylene and 1-octene comonomer, such as those designated as DOWLEX® Next Generation (NG) resins, available from Dow Chemical Corporation, a business with offices located in Midland, Mich. The "super-octene" resins are made with a catalyst system other than "metallocene" or INSITE®. The Next Generation DOWLEX resins are very suitable for demanding stretch applications. Suitable "super-octene" resins useful in the present invention include, for example, DOWLEX® NG 3347A LLDPE resin which contain about 7% octene (nominal weight %) and 93% ethylene. Other resins suitable for this invention may include DOWLEX® NG 3310. Still other suitable materials include, for example, random copolymers, such as random copolymers containing propylene and ethylene, for example UNION CARBIDE 6D81 and 6D82 random copolymers containing 5.5% ethylene, which are available from Union Carbide Corporation, a business having offices in Danbury, Conn.

The polymer resin or source material may contain small amounts (e.g. about 0.05 to 5 parts of additive to 100 parts of resin) of processing additives and solid-state performance modifiers. Such additives may include calcium stearate or other acid scavengers, organosilicone compounds, silicon glycol copolymers, olefinic elastomers, and low molecular weight paraffin's or other lubricating additives. The various additives can have a plasticizing effect, can improve the strength and softness of the film, and can help facilitate one or more of the extrusion, film casting, and stretching processes.

The source material for the film 20 can also include a further supplemental material, and the supplemental material may include a filler material, and a surfactant or other surface-active material. The filler material can be a particulate material 30 which can help provide porosity-initiating, debonding sites to enhance the desired formation of pores during the various stretching operations applied to the film. The filler material can help provide a desired surface-modified film, and can help enhance a advantageous "sliding effect" generated during subsequent stretching operations. For example, the particular modification of the surface of the filler particles 30 by the incorporation of lubricating and release agents can facilitate the formation of microvoids and the development of the desired porous structure by reducing agglomeration, as well as reducing adhesion and friction at filler-resin interface. Another surface modification of the fillers using hydrophilic surfactants can also provide a controlled interaction with liquids, such as aqueous liquids, and allow a desired amount of liquid access into the porous structure. Techniques which incorporate particularly selected, surface-modified fillers can also provide higher production speeds for the porous film, and can reduce the production costs of the film. In addition, the filler material can help preserve the pores that are generated during the various stretching operations.

Where the supplemental material includes a surface-active material, such as a surfactant or other material having a low surface energy (e.g. silicone oil), the surface-active material can help reduce the surface energy of the film as well as provide lubrication among the polymer segments which form the film. The reduced surface energy and lubrication can help create the "sliding effect" during the subsequent stretching operations.

The supplemental filler material can be organic or inorganic, and is desirably in the form of individual, discrete particles. Examples of an inorganic filler can include metal oxides, as well as hydroxides, carbonates and sulfates of metals. Other suitable inorganic fillers can include, for example, calcium carbonate, various kinds of clay, silica, alumina, barium sulfate, sodium carbonate, magnesium carbonate, magnesium sulfate, barium carbonate, kaolin, carbon, calcium oxide, magnesium oxide, aluminum hydroxide, titanium dioxide, powdered metals, glass microspheres, or vugular void-containing particles. Still other inorganic fillers can include those with particles having higher aspect ratios, such as talc, mica, and wollastonite, but such fillers may be less effective because they can act as a reinforcing elements, thus increasing rigidity of the filled resin and inhibiting void growth by restraining plastic yielding and drawing of the polymer resin. Representative organic fillers can include, for example, pulp powders, wood powders, cellulose derivatives, chitin, chitozan powder, powders of highly crystalline, high melting polymers, beads of highly crosslinked polymers, powders of organosilicones, and the like, as well as combinations and derivatives thereof.

When compounding with polyolefins, the filler content can typically vary from about 30 wt. % to about 65 wt. % and average particle size can range from about 0.1 micron to about 5 microns. The draw ratio during the stretching of the filled polymer films or sheets can be in the range of about 100% to 400%, and can provide for a porosity of up to 70–80%.

In particular aspects of the invention, the fillers can have an average particle size which is not more than about 10 microns ($\mu$m). Alternatively, the average particle size can be not more than about 5 $\mu$m, and optionally, can be not more than about 1 $\mu$m to provide improved processibility. In other aspects of the invention, the top cut particle size is not more than about 50 $\mu$m. Alternatively, and the top cut particle size can be not more than about 20 $\mu$m, and optionally can be not more than about 8 $\mu$m to provide improved processibility during the formation of film having the desired size and porous structure. The fillers may also be surface-modified by the incorporation of surfactants, and/or other materials, such as stearic or behenic acid, which can be employed to improve the processibility of the source material.

In other aspects of the invention, the filler material can be not less than about 5 wt % of total composite weight of the source material. Alternatively, the amount of filler material is not less than 10 wt %, and optionally is not less than 20 wt %. In other aspects of the invention, the amount of filler material can up to about 90 wt %. Alternatively, the amount of filler material can be not more than about 80 wt % and optionally can be not more than about 70 wt %.

Suitable filler materials can include one or more of the following:

1. SUPERMITE, an ultrafine ground $CaCO_3$, which is available from ECC International, a business having offices located in Atlanta, Ga. 30342, 5775 Peachtree-Dunwoody Road. This material can have a top cut particle size of about 8 $\mu$m and a mean particle size of about 1 μm. . This filler can be coated with a surfactant, such as DOW CORNING 193 surfactant, before the compounding or other combining with the source material . The filler can also be coated with other appropriate surfactants, such as those mentioned elsewhere in the present description.

2. SUPERCOAT, a coated ultrafine ground $CaCO_3$ which is available from ECC International, a business having offices located in Atlanta, Ga. 30342, 5775 Peachtree-Dunwoody Road. This material can have a top cut particle size of about 8 μm and a mean particle size of about 1 μm.

3. OMYACARB UF, high purity, ultrafine, wet ground $CaCO_3$, which is available from OMYA, Inc., a business having offices located in Proctor, Vt. 05765. This material can have a top cut particle size of about 4 μm and a average particle size of about 0.7 μm, and can provide good processibility. This filler can be coated with a surfactant, such as DOW CORNING 193 surfactant, before the compounding or other combining with the source material. The filler can also be coated with other appropriate surfactants, such as those mentioned elsewhere in the present description.

4. OMYACARB UFT $CaCO_3$, ultrafine pigment surface-coated with stearic acid, which is available from OMYA, Inc. This material can have a top cut particle size of about 4 μm and a mean particle size of about 0.7 μm, and can provide good processibility.

By modifying the surface of the filler particles to become substantially and/or significantly hydrophilic, at least a partial wettability of the internal, microporous structure within the bulk of the film can be achieved. The filler particles can carry a hydrophilic surfactant. For example, silicon glycol copolymers, ethylene glycol oligomers, acrylic acid, hydrogen-bonded complexes, and other hydrophilic surfactants can be used as the surface modifiers. The fillers may be also subjected to a surface treatment with various coatings and surfactants to impart an affinity to the polymer resin, to reduce filler agglomeration, and to improve filler dispersion, as well as to provide the controlled interaction with fluids, such as body fluids, blood or water.

In addition to promoting the formation of microvoids and promoting increased water access, the modified fillers can be configured to render other desired functional attributes to the film material. For example, calcium carbonate can increase the opacity and softness of the material and can reduce malodor. Deodorant properties may also be imparted into the film material by using other, specifically treated microporous fillers; e.g., silica gel particles.

The supplemental material can optionally include a surface-active material, such as a surfactant or other material having a low surface energy and providing wettability by water and other aqueous liquids. The surface-active material may be blended or otherwise incorporated into the source material employing various techniques. Desired aspects of the invention can include surface-active material which has been carried into the film on the outer surfaces of the filler particles. As a result, desired levels of wettability can be provided not only on the outer, major facing surfaces of the film, but also on the internal wall surfaces of the porous or microporous channel structures located between the facing surfaces to provide a driving force for liquid flow into intrinsic, internal regions of the material.

In particular aspects of the invention, the surfactant, or other surface-active material, can have a Hydrophile-Lipophile Balance (HLB) number which is not more than about 18. Alternatively, the HLB number is not more than about 16, and optionally is not more than about 15. In other aspects of the invention, the HLB number is not less than about 6. Alternatively, the HLB number is not less than about 8, and optionally the HLB number is not less than about 12. When the HLB number is too low, there can be insufficient wettability. When the HLB number is too high, the surfactant may have insufficient adhesion to the polymer matrix of the source material, and may be too easily washed away during use. The HLB numbers of commercially available surfactants can be found in McCUTCHEON's Vol 2: Functional Materials, 1995.

Suitable surfactants can include silicon glycol copolymers, carboxilated alcohol ethoxylates, various ethoxylated alcohols, ethoxylated alkyl phenols, ethoxylated fatty esters and the like, as well as combinations thereof.

Other suitable surfactants can, for example, include one or more of the following:

(1) surfactants composed of ethoxylated alkyl phenols, such as IGEPAL RC-620, RC-630, CA-620, 630, 720, CO-530, 610, 630, 660, 710 and 730, which are available from Rhone-Poulenc, a business having offices located in Cranbury, N.J.

(2) surfactants composed of silicone glycol copolymers, such as DOW CORNING D190, D193, FF400, and D1315, which are available from Dow Corning, a business having offices located in Midland, Mich.

(3) surfactants composed of ethoxylated mono- and diglycerides, such as MAZEL 80 MGK, MASIL SF 19, and MAZEL 165C, which are available from PPG Industries, a business having offices located in Gurnee, Ill. 60031.

(4) surfactants composed of ethoxylated alcohols, such as GENAPOL 26-L-98N, GENAPOL 26-L-60N, and GENAPOL 26-L-5, which are available from Hoechst Celanese Corp., a business having offices located in Charlotte, N.C. 28217.

(5) surfactants composed of carboxilated alcohol ethoxylates, such as MARLOWET 4700 and MARLOWET 4703, which are available from Huls America Inc., a business having offices located in Piscataway, N.J. 08854.

(6) ethoxylated fatty esters, such as PATIONIC 138C, PATIONIC 122A, and PATIONIC SSL, which are available from R.I.T.A. Corp., a business having offices located in Woodstock, Ill. 60098.

The amount of surfactant or other surface-active material can be at least about 0.5 wt % of the total, composite source material. Alternatively, the amount of surfactant can be at least about 1 wt %, and optionally, can be at least about 2 wt %. In other aspects of the invention, the amount of the surfactant can be not more than about 20 wt %. Alternatively, the amount of surfactant can be not more than about 15 wt %, and optionally, can be not more than about 10 wt %.

Further aspects of the invention can be configured with the amount of surfactant measuring not less than about 3 wt % of the weight of the filler material. Optionally, the surfactant can be not less than about 4 wt %, and optionally can be not less than about 6 wt % of the weight of the filler material. In still other aspects, the amount of surfactant can be not more than about 12 wt % of the weight of the filler material. Optionally, the surfactant can be not more than about 11 wt %, and optionally can be not more than about 10 wt % of the weight of the filler material to provide desired benefits.

A suitable technique for forming the porous film 20 is described in U.S. patent application Ser. No. 932,817 entitled PROCESS FOR MAKING MICROPOROUS FILMS WITH IMPROVED PROPERTIES, filed Sep. 16, 1997 by V. A. Topolkaraev et al. (attorney docket No. 13,198) which corresponds to U.S. Pat. No. 5,800,758 issued Sep. 1, 1998, the entire disclosure of which is hereby incorporated herein by reference in a manner that is consistent (not in contradiction) herewith.

The porous film, in its various aspects, can exhibit improved combinations of pore shape, pore size, pore distribution, film modulus, film tensile strength, and/or film elongation-to-break, as well as desired levels of breathability, wettability and/or water absorption.

The various configurations of the porous film 20 can have a relatively low thickness. In particular aspects, the porous film can have a film thickness of not more than about 1 mm. Alternatively, the porous film thickness can be not more than about 0.5 mm, and optionally, can be not more than about 0.3 mm. In other aspects, the porous film can have a lower boundary thickness value which is about 0.01 mm, or less, and optionally is about 0.05 mm, or less to provide desired performance.

In particular aspects of the invention, the porous film can have tensile strength in a first, machine direction (MD) of not less than about 6 Mega-Pascal (6 MPa). Alternatively, the tensile strength can be not less than about 10 MPa, and optionally can be not less than about 15 MPa. In other aspects, the film of the invention can provide for a microporous film tensile strength in the MD not more than about 300 MPa. Alternatively, the MD film tensile strength can be not more than about 100 MPa, and optionally can be not more than about 40 MPa to provide improved performance and processibility during subsequent manufacturing operations. The machine direction of the film is a first major direction of the film, and typically is the direction along which the film is moved during manufacture or processing. Where the film is stretched, the MD is typically aligned along the initial direction of stretch applied to the film.

In other aspects of the invention, the tensile strength of the porous film in a second, transverse direction (TD) can be not less than about 6 MPa. Alternatively, the TD tensile strength can be not less than about 9 MPa, and optionally can be not less than about 12 MPa. In other aspects, the microporous film can have TD strength of not more than about 300 MPa. Alternatively, the TD film strength can be not higher than 100 MPa, and optionally can be not more than 30 MPa. The TD is a second major direction of the film, and lies perpendicular to the MD and generally along the plane of the film.

In further aspects, the porous film 20 can exhibit a percent elongation-at-break in the machine direction (MD) of not less than about 30%, as determined by the formula: 100 * $(L_f-L_i)/L_i$; where $L_f$ is the final length of a film sample at break, and $L_i$ is the initial length of the film sample prior to elongation. Alternatively, the elongation-at-break can be not less than 100%, and optionally can be not less than about 150% to provide improved performance. In other aspects, the microporous film can have an MD elongation-at-break of not more than about 1500%. Alternatively, the MD elongation-at-break can be not more than about 1000%, and optionally, can be not more than about 500% to provide desired benefits.

Other aspects of the invention can provide a porous film with an elongation-at-break in the transverse direction which is not less than about 30%, and desirably is not less than about 50%. Alternatively, the TD elongation-at-break can be not less than about 100%, and optionally can be not less than about 150% to provide improved performance. In other aspects, the microporous film can have an elongation-at-break, in the TD, of not more than about 1500%. Alternatively, the TD elongation-at-break can be not more than about 1000%, and optionally can be not more than about 500% to provide desired benefits.

Particular aspects of the invention can provide a porous film having an elastic, Young's modulus, in the machine direction, of not less than about 1 MPa. Alternatively, the MD modulus can be not less than about 5 MPa, and optionally can be not less than about 10 MPa. In other aspects, the microporous film can have a MD modulus of not more than about 500 MPa. Alternatively, the MD modulus can not be more than about 200 MPa, and optionally, can be not more than about 50 MPa.

Further aspects of the invention can provide a porous film having a Young's modulus, in the transverse direction, of not less than about 1 MPa. Alternatively, the TD modulus can be not less than about 3 MPa, and optionally, can be not less than about 5 MPa. In other aspects, the microporous film can have a TD modulus of not more than about 500 MPa. Alternatively, the TD modulus can be not more than about 150 MPa, and optionally, can be not more than about 50 MPa.

Additional aspects of the porous film of the invention can advantageously provide an enhanced WVTR value. In particular aspects of the invention, the WVTR of the porous film can be not less than about 1000 g/sq.m/24 hr/mil (grams per square meter, per 24 hours, per 0.001 inch of film thickness). Alternatively, the WVTR can be not less than about 1,500 g/sq.m/24 hr/mil, and can be not less than about 2,000 g/sq.m/24 hr/mil to provide improved performance. Optionally, the WVTR can be not less than about 10,000 g/sq.m/24 hr/mil. In other aspects, the WVTR can be not more than about 60,000 g/sq.m/24 hr/mil. Alternatively, the WVTR value can be not more than about 30,000 g/sq.m/24 hr/mil, and optionally, can be not more than about 20,000 g/sq.m/24 hr/mil.

In still other aspects, the porous film of the present invention is hydrophilic, and is readily wettable by water and other aqueous liquids. Desirably, the contact angle with water of the porous film can be approximately 0° (0 degrees). Alternatively, the contact angle can be not less than about 3 degrees, and optionally, can be not less than about 5 degrees. In other aspects, the contact angle can be not more than about 80 degrees. Alternatively, the water contact angle can be not more than about 75 degrees, and optionally, can be not more than about 70 degrees to provide improved performance. The wettability and spreading of the water or other aqueous liquid can be exhibited by the final film after it has been stretched. As a result, the stretched film is non-hydrophobic.

Further aspects of the invention include a microporous film which has been produced from a precursor film layer which is sufficiently hydrophilic and wettable to provide a water contact angle of not more than about 37 degrees, and which may provide a water contact angle of not more than about 36.5 degrees. Alternatively, the precursor film provides a water contact angle of not more than about 33, and optionally, not more than about 30 degrees to provide desired improvements in performance. The precursor film is the layer of film material prior to the stretching or other operation that is employed to generate the porous structure within the final film layer.

Figure 18:
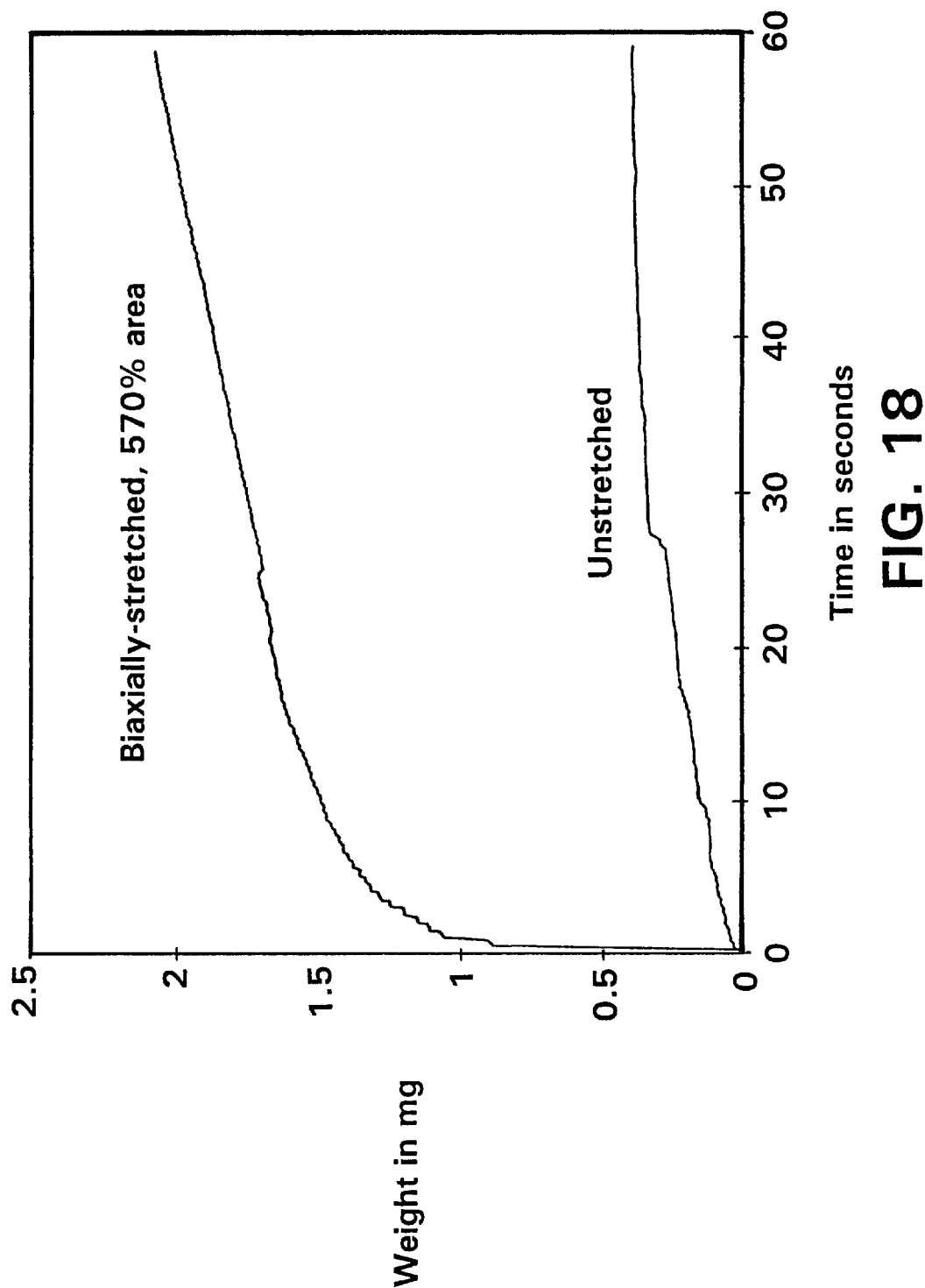
FIG. 18 shows a representative, graphical plot of the gained weight of water versus time for a biaxially stretched porous film sample of the invention, and for an unstretched precursor hydrophilic film.

With reference to FIG. 18, the hydrophilic microporous film of the present invention can also advantageously provide improved water accessibility. In particular aspects of the invention, the water uptake rate of the hydrophilic porous film can be not less than about 0.01 mg/sec.

Alternatively, the water uptake rate can be not less than about 0.03 mg/sec, and optionally can be not less than about 0.06 mg/sec. In other aspects, the water uptake rate can be not more than about 10 mg/sec, alternatively, can be not more than about 5 mg/sec, and optionally can be not more than about 2 mg/sec.

In additional aspects, the water uptake amount of the hydrophilic porous film can be not less than about 0.1 mg of water per mg of film (0.1 mg/mg) in 60 sec. Alternatively, the water uptake amount can be not less than about 0.5 mg/mg in 60 sec, and optionally can be not less than about 1 mg/mg in 60 sec. In other aspects, the water uptake amount can be not more than about 40 mg/mg in 60 sec. Alternatively, the water uptake amount can be not more than about 15 mg/mg in 60 sec, and optionally can be not more than about 5 mg/mg in 60 sec to provide improved benefits.

Further aspects of the microporous film can have an enhanced surface texture, which can provide improved air circulation and tactile properties. The surface texture of the microporous film can have the average peak height of not less than about 0.45 microns ($\mu$m). Alternatively, the microporous film can have a surface texture with an average peak height which is not less than about 0.65 microns, and optionally, is not less than about 0.8 microns. In other aspects, the microporous film can have the surface texture with an average peak height of not more than about 30 microns. Alternatively, the average peak height can be not more than about 10 microns, and optionally, can be not more than about 5 microns to provide desired tactile and physical properties.

Suitable testing techniques for obtaining the data for determining the various mechanical properties and water accessibility properties of the porous film are further described in the Test Procedures section, set forth hereinbelow.

A plurality of the voids or pores 22 which impart the desired porosity to the film 20 can be distributed over the outer surface of the film and can also be distributed through the interior of the film. In particular aspects, the porous structure of the film 20 includes elongate voids of generally ellipsoidal shape, and/or voids having a substantially spherical shape. Desirably, the voids have their elongated, or otherwise relatively longer, major axes aligned substantially along an direction or axis of the film which has been subjected to a relatively higher draw ratio. In particular aspects of the invention, the voids can have pore sizes which include an major axis length which is at least about 0.05 microns ($\mu$m). Alternatively, the length of the major axis of the voids can be at least about 0.2 $\mu$m, and optionally can be at least about 1 $\mu$m. In other aspects, the length of the major axis of the voids can be not more than about 100 $\mu$m. Alternatively, the major axis length of the voids can be not more than about 50 $\mu$m, and optionally can be not more than about 20 $\mu$m to provide the desired improved performance.

To help provide for the desired combination of mechanical strength and water accessibility, particular aspects of the invention have films in which the voids of desired pore size dimensions constitute at least about 98% of the total number of pores on either or both of the film outer surface or film cross-section. Alternatively, the voids of the desired pore size dimensions constitute at least about 70%, and optionally constitute at least about 50% of the total number of pores on either or both of the film outer surface or film cross-section.

In particular aspects of the porous films of the invention, the voids having a major axis length within the range of about 0.05–100 $\mu$m can constitute at least about 98% of the total number of pores on either or both of the film outer surface and film cross-section. In other aspects, voids having a major axis length within the range of about 0.2–50 $\mu$m can constitute at least about 70%, and optionally can constitute at least about 50% of the total number of pores on either or both of the film outer surface and the film cross-section to provide desired improvements in mechanical and water accessibility properties.

Figure 1:
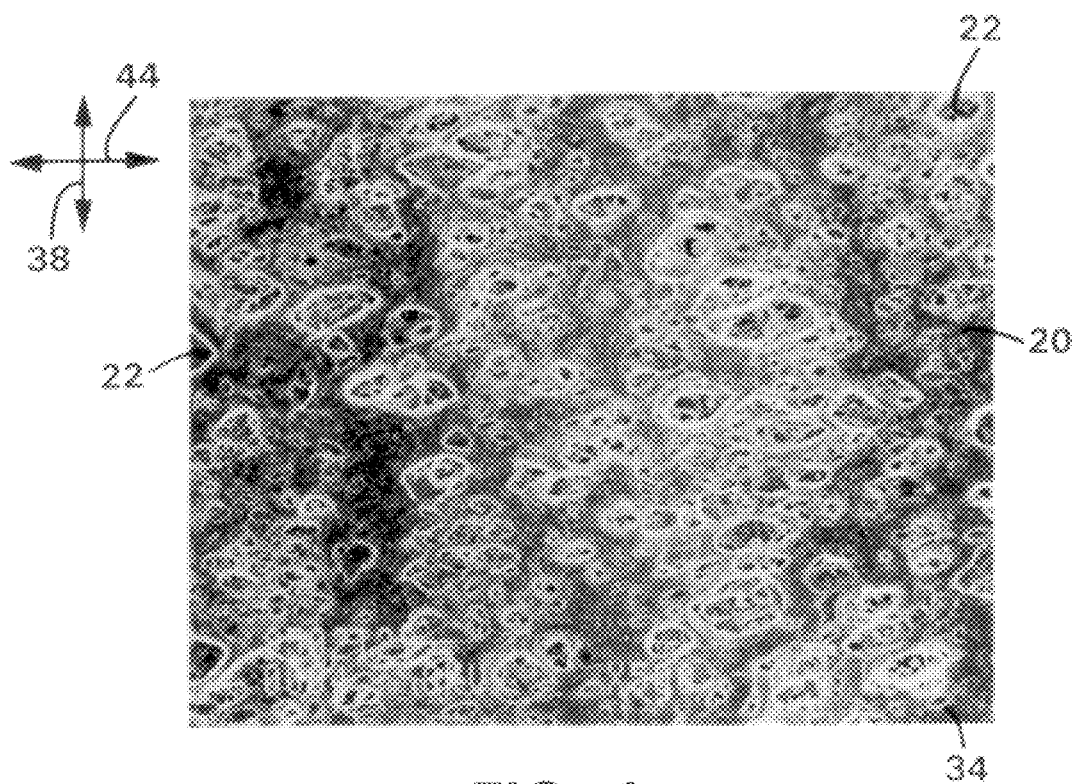
FIG. 1 is a scanning electron photomicrograph, taken at a magnification of 500 X, showing a representative view of a major facing surface of biaxially stretched porous film of the present invention.
Figure 2:
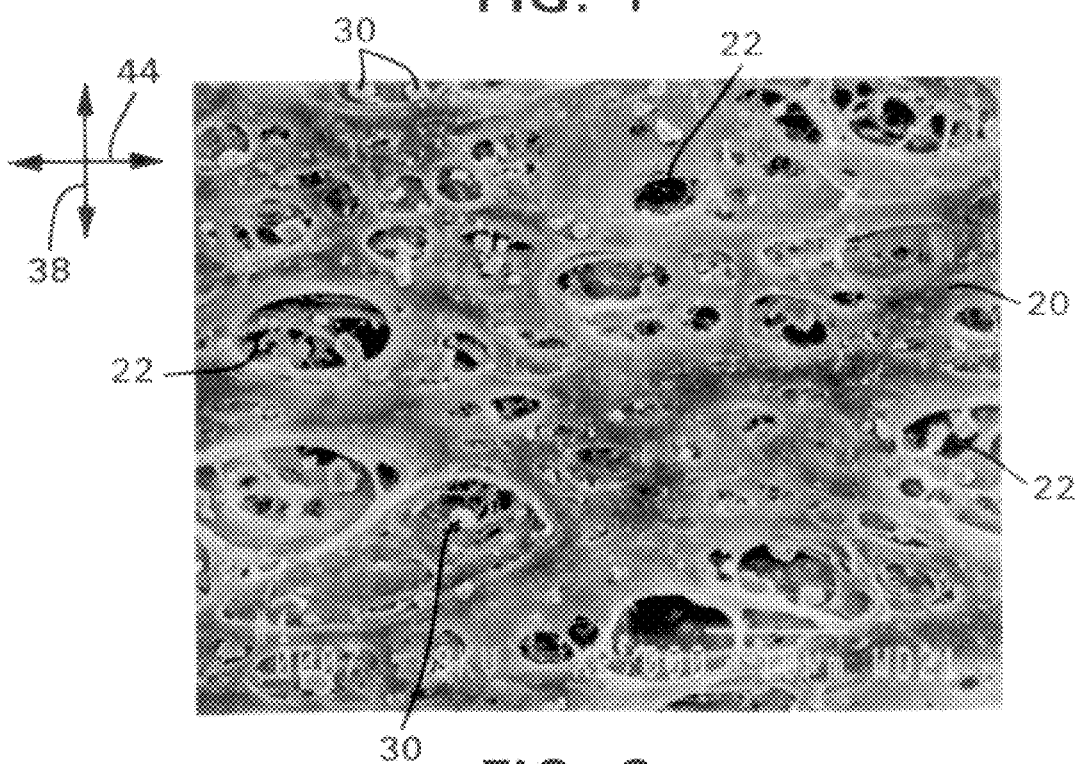
FIG. 2 is a scanning electron photomicrograph, taken at a magnification of 2000 X, showing an enlarged view of a portion of FIG. 1.
Figure 2A:
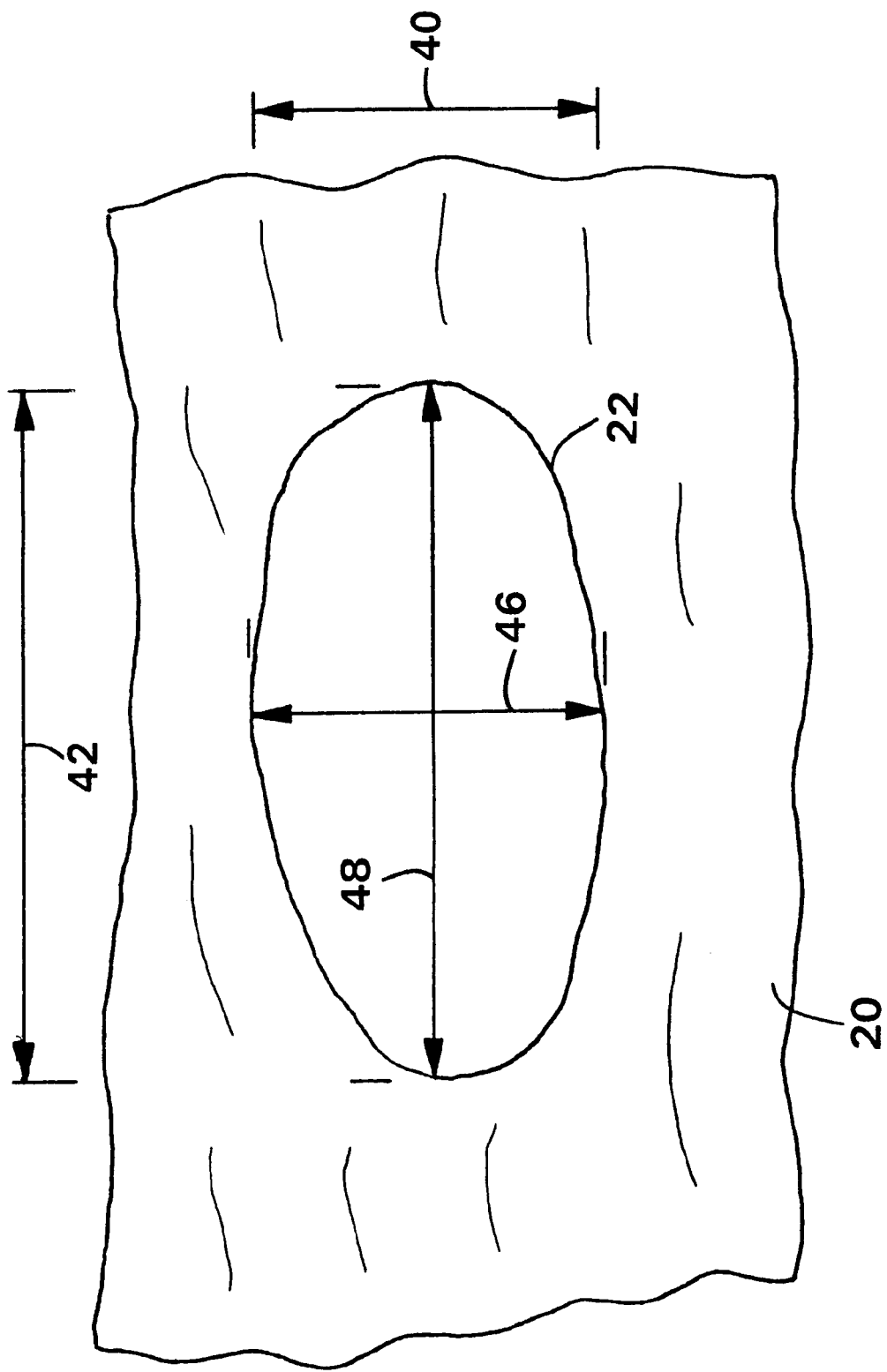
FIG. 2A shows a representative, schematic view of a material having a pore produced in accordance with the present invention.
Figure 3:
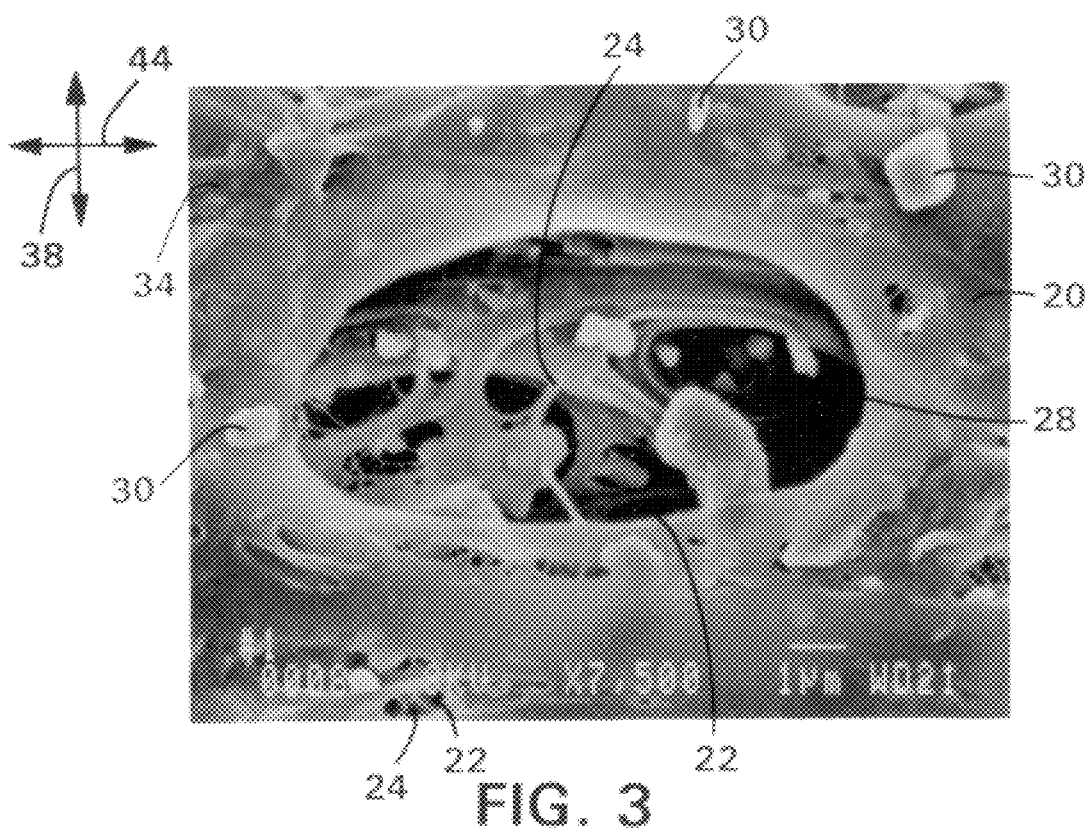
FIG. 3 is a scanning electron photomicrograph, taken at a magnification of 7500 X, showing an enlarged view of a portion of FIG. 2.
Figure 4:
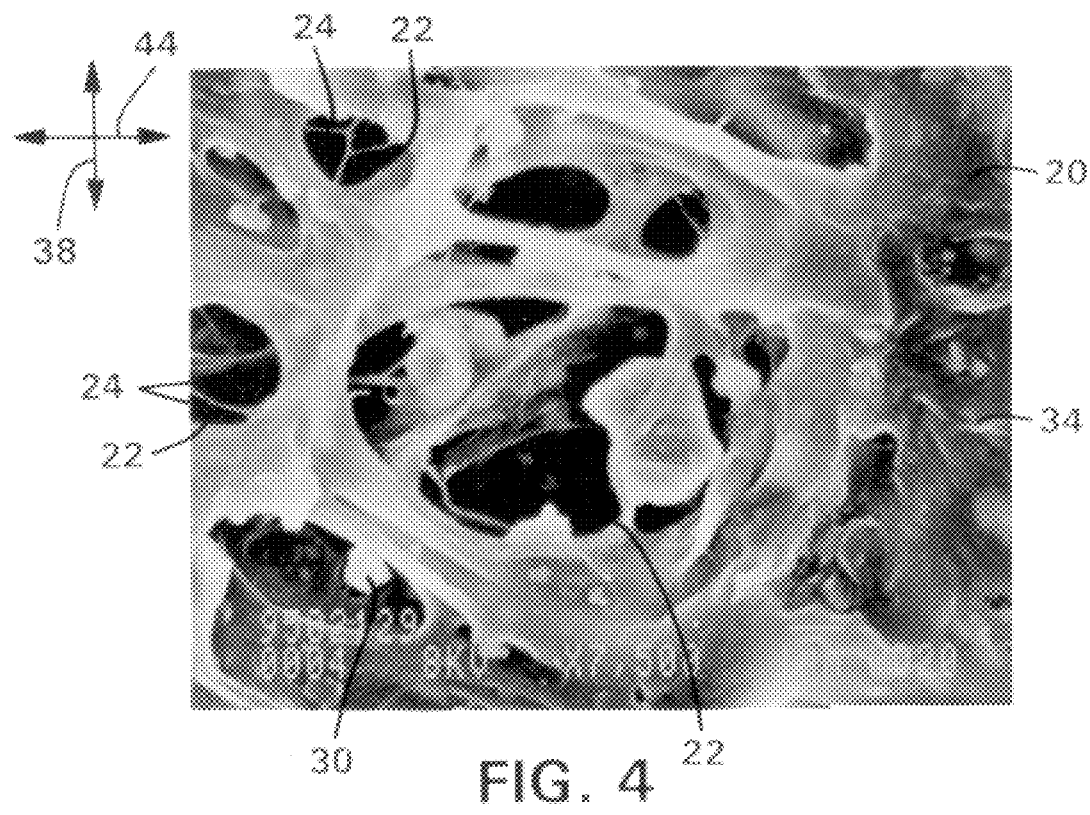
FIG. 4 is a scanning electron photomicrograph, taken at a magnification of 7500 X, showing an enlarged view of a portion of FIG. 1.

The elongate pores or voids can also have an aspect ratio value which is determined by the ratio of the length 42 of the pore major axis 48 to the length 40 of a pore minor axis 46, as representatively shown in FIG. 2A. In further aspects of the invention, the aspect ratio is not less than about 1. Alternatively, the aspect ratio is not less than about 1.2, and optionally is not less than about 1.5. In other aspects, the aspect ratio is not more than about 30.

Alternatively, the aspect ratio is not more than about 15, and optionally is not more than about 10 to provide improved porosity characteristics and film performance. The major axis of each elongate pore or void is typically an axis aligned substantially along the longitudinal dimension of the film, and can typically be represented by the largest length measurement of each pores. The minor axis of the pore is aligned substantially parallel to a major, facing surface of the porous film, and is aligned perpendicular to the major axis, as observed in the photomicrograph or other imaging or measuring mechanism employed to determine the aspect ratio.

As illustrated in FIGS. 1 through 4, 11, and 13 through 14, the porous structure of the film 20 can have surface-open pores distributed to open across either or both of the outer, major surfaces 34 of the film. In particular aspects, a major facing surface of the film can have an average surface-open pore area of not less than about 5% of the surface area of the major facing surface. Alternatively, the surface-open pore area can be not less than about 10% of the surface area of the major facing surface, and optionally, can be not less than about 20% of the surface area of the major facing surface to provide desired levels of improved performance. In further aspects, a major facing surface of the film can have an average surface-open pore area of not more than about 80% of the surface area of the major facing surface. Alternatively, the surface-open pore area can be not more than about 60% of the surface area of the major facing surface, and optionally, can be not more than about 40% of the surface area of the major facing surface to provide desired levels of improved performance.

Additional aspects of the invention can include major surfaces which exhibit surface-open pore voids with an average pore area (per pore) of not less than about 0.5 micron$^2$ (0.5 $\mu$m$^2$). Alternatively, the average pore area (per pore) is not less than about 2 $\mu$m$^2$, and optionally is not less than about 8 $\mu$m$^2$. In other aspects, the average pore area (per pore) is not more than about 500 $\mu$m$^2$. Alternatively, the average pore area (per pore) is not more than about 150 $\mu$m$^2$, and optionally is not more than about 50 $\mu$m$^2$ to provide desired improvements in wettability and liquid penetration.

In further aspects, the surface pores can have a distribution with a pore number per unit of outer surface area of not less than about 100 voids per square millimeter (100/mm$^2$). Alternatively, the pore number per unit of outer surface area is not less than about 1000/mm$^2$, and optionally is not less than about 5000/mm$^2$. In further aspects, the pore number per unit of outer surface area is not more than about 500,000/mm$^2$. Alternatively, the pore number per unit of outer surface area is not more than about 100,000/mm$^2$, and optionally is not more than about 50,000/mm$^2$ to provide desired improvements.

As illustrated in FIGS. 5, 6, 7, and 12, the porous structure of the invention includes a generally random, irregular array of pores which are distributed throughout the cross-sectional area of the film 20. The cross-section taken along CD direction, can exhibit pore voids with an average pore area (per pore) of not less than about 0.03 micron$^2$ (0.03 $\mu$m$^2$). Alternatively, the average pore area (per pore) is not less than about 0.1 $\mu$m$^2$, and optionally is not less than about 0.5 $\mu$m$^2$. In other aspects, the average pore area (per pore) is not more than about 100 $\mu$m$^2$. Alternatively, the average pore area (per pore) is not more than about 30 $\mu$m$^2$, and optionally is not more than about 10 82 m$^2$ to provide desired improvements in wettability and liquid penetration.

The porous structure of the film 20 can also have pores distributed along its cross-sectional area to provide a pore number per unit area which is not less than about 0.01/$\mu$m$^2$ (0.01 voids per $\mu$m$^2$). Alternatively, the pore number per unit of area is not less than about 0.03/$\mu$m$^2$, and optionally is not less than about 0.1/$\mu$m$^2$. In other aspects, the pore number per unit area is not more than about 30/$\mu$m$^2$ (30 voids per $\mu$m$^2$). Alternatively, the pore number per unit area is not more than about 10/$\mu$m$^2$, and optionally is not more than about 2/$\mu$m$^2$ to provide desired improvements in wettability and liquid penetration.

In further aspects, the porous structure of the film 20 has pores distributed along the film cross-section wherein a sum of the areas of the individual, cross-sectioned pores provides a total pore area which not less than about 5% of the total area encompassed by the correspondingly associated cross-section of the film (a percent pore area of not less than about 5%). Alternatively, the percent pore area is not less than about 10%, and optionally is not less than about 15%. In other aspects, the percent pore area is not more than about 70%. Alternatively, the percent pore area is not more than about 60%, and optionally is not more than about 40% to provide desired improvements.

Figure 11:
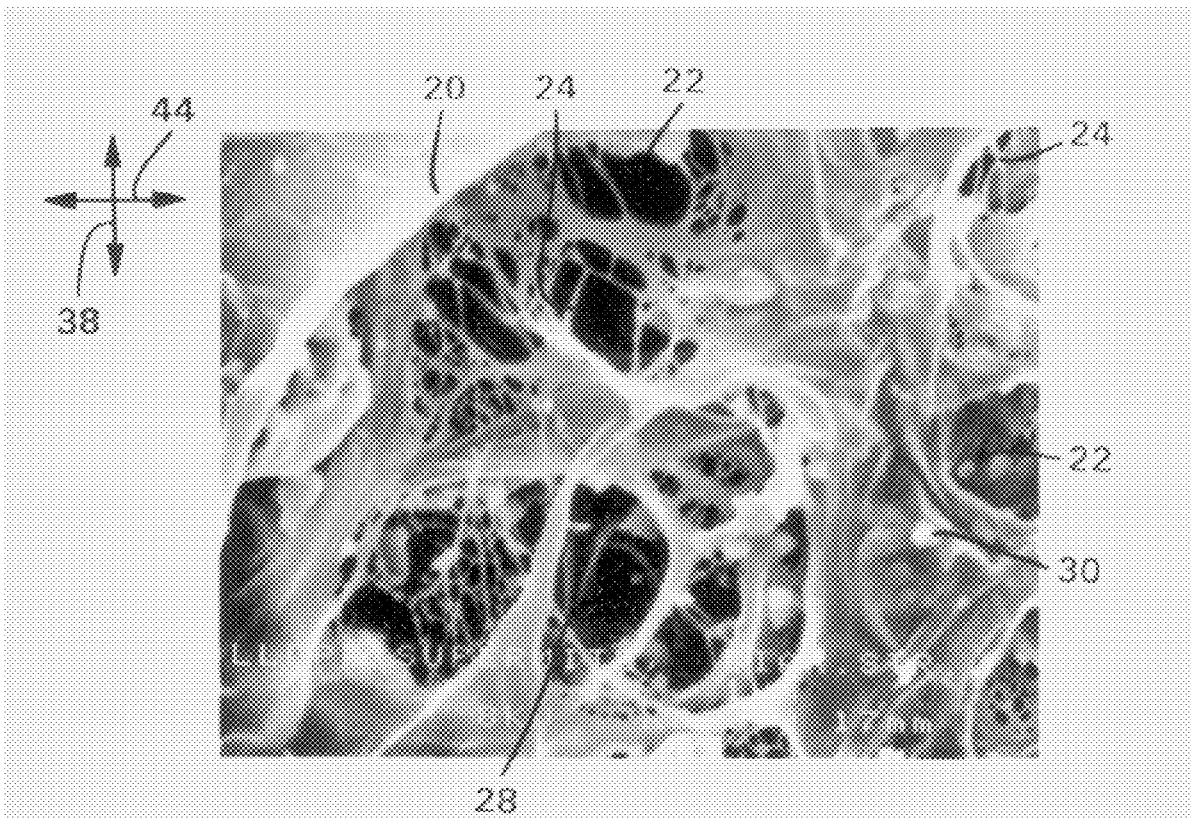
FIG. 11 shows a scanning electron photomicrograph, taken at a magnification of 7,500 X, showing an enlarged surface view of another film of the invention.
Figure 12:
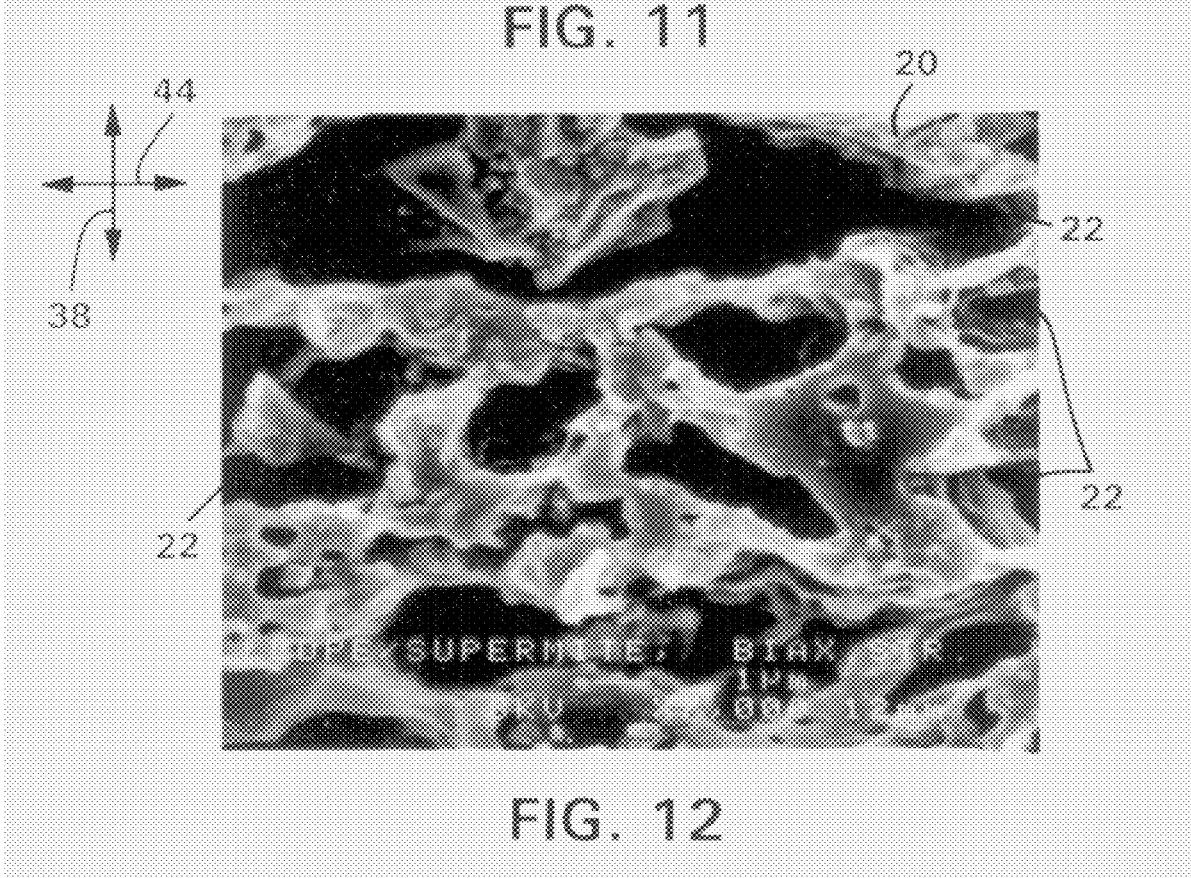
FIG. 12 shows a scanning electron photomicrograph, taken at a magnification of 7,000 X, showing an enlarged cross-sectional view of the film of FIG. 11.
Figure 13:
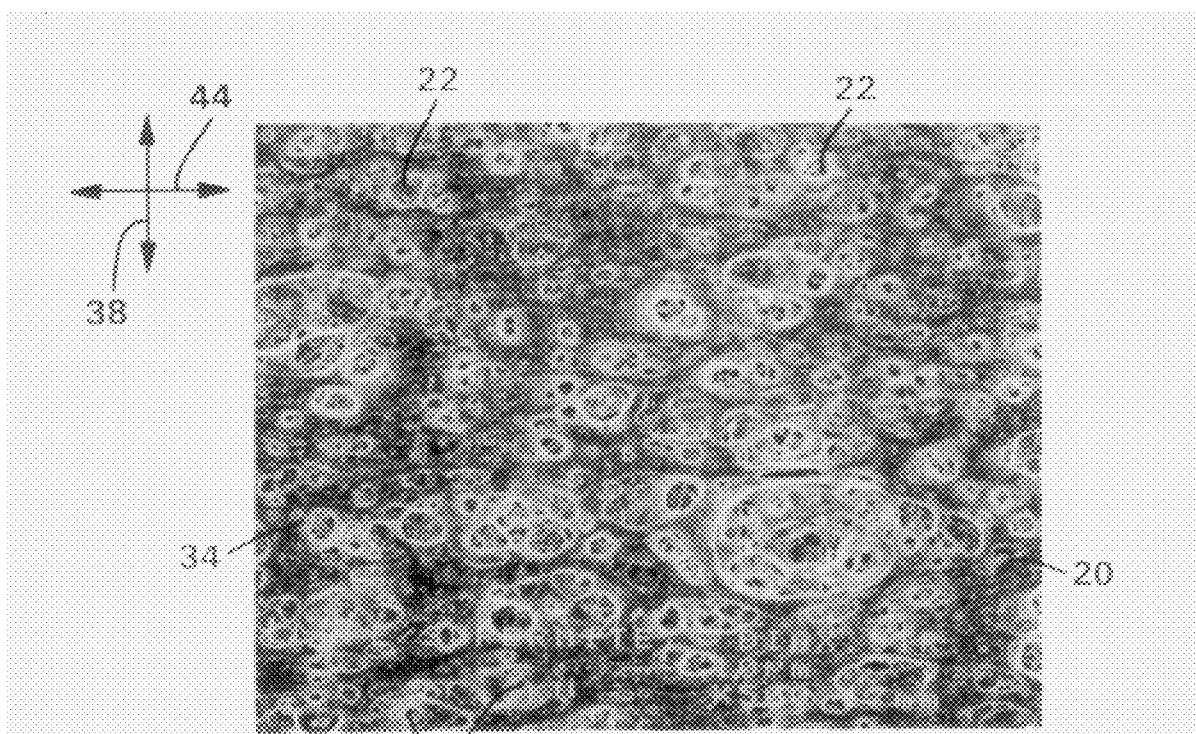
FIG. 13 shows a scanning electron photomicrograph, taken at a magnification of 500 X, showing an enlarged, surface view of another film of the invention.
Figure 14:
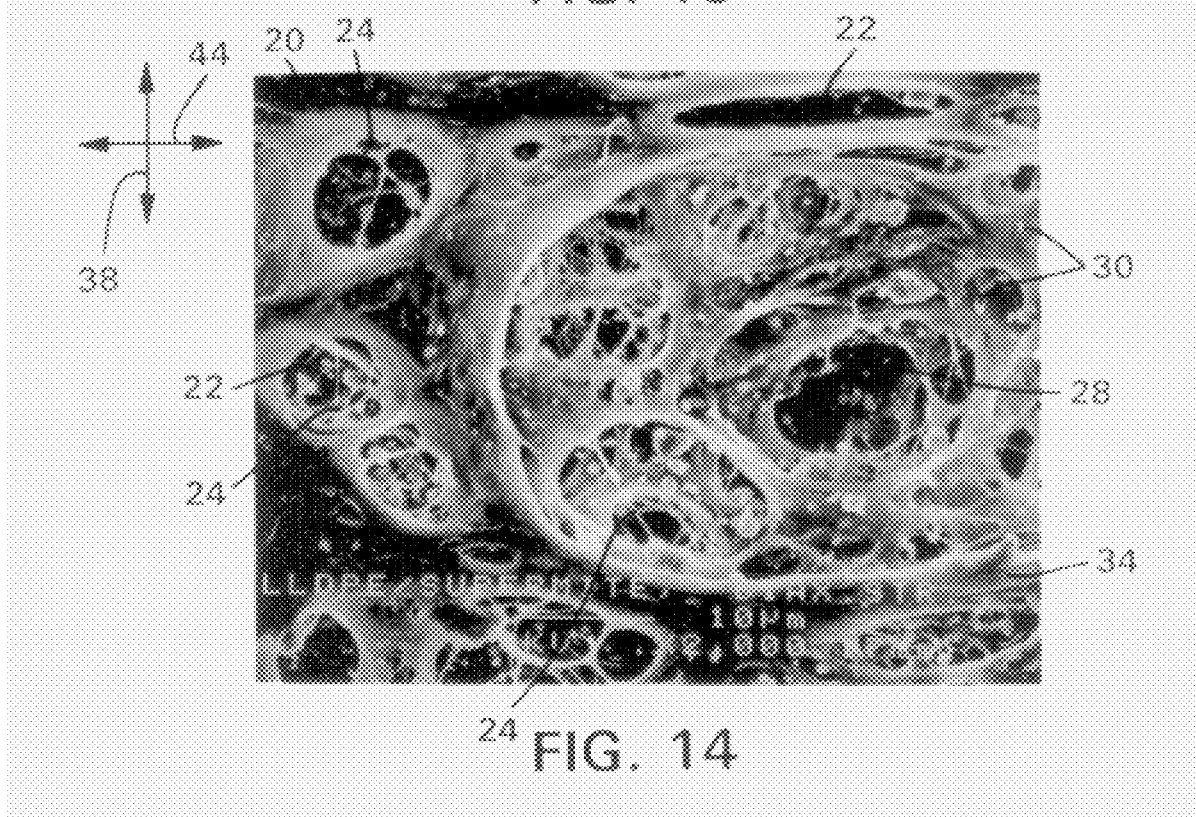
FIG. 14 shows a scanning electron photomicrograph, taken at a magnification of 2,000 X, showing a further enlarged, surface view of the film of FIG. 13.
Figure 15:
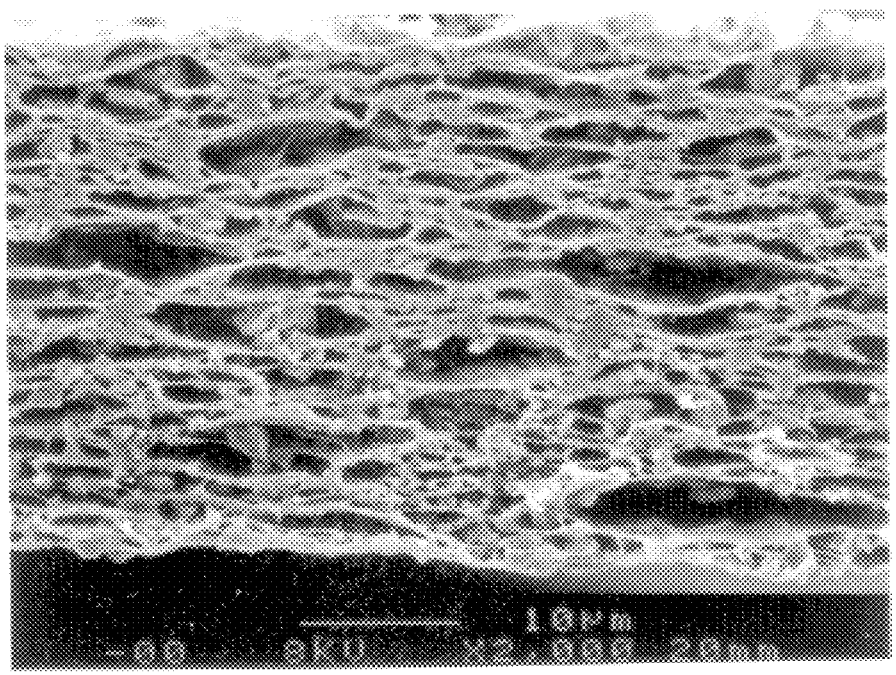
FIG. 15 shows a cross-sectional view of a prior art, porous film.
Figure 16:
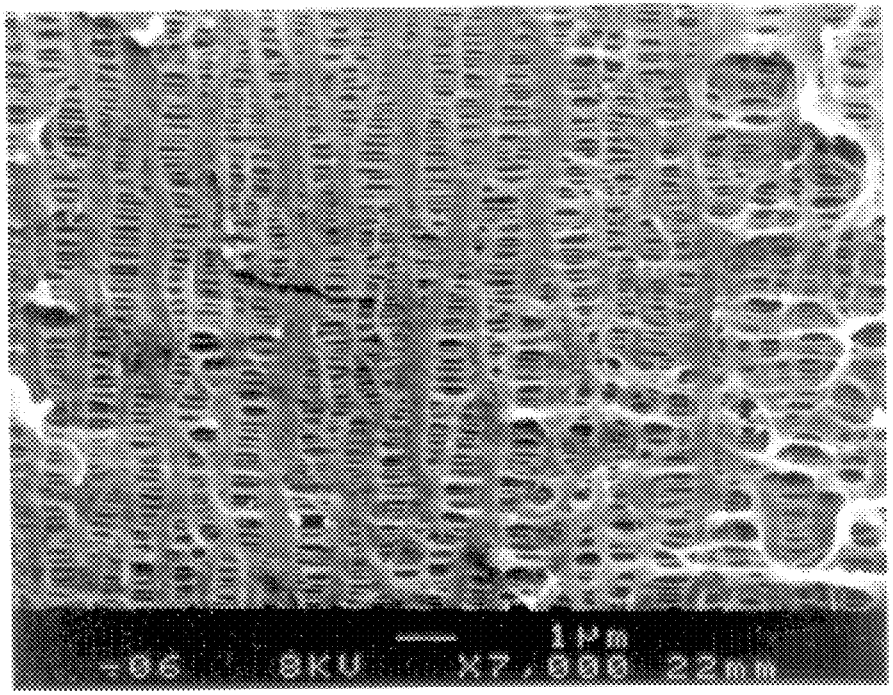
FIG. 16 shows a cross-sectional view of another prior art porous film.

The interconnected-pore morphology of the voids or pores 22 formed within the material of the porous film 20 is representatively shown in FIGS. 11 through 14. In particular aspects of the interconnected morphology, are substantially randomly positioned across the major outer surfaces of the film and through the thickness of the film. The film material is arranged in a generally random, irregularly connected network having a multiplicity of strands or ligaments 24 of film material which extend through and span across the void spaces to interconnect with other segments of the film material. With reference to FIGS. 11 and 14, the ligaments can be observed as a contiguous, three-dimensional, spidery array of filaments. As a result, operative passageways 28 traversing through the interconnecting pores are arranged as a tortuous system of twisting and turning channels which can operatively connect and communicate between the major, outer surfaces 34 of the film 20. In particular, the porous film can exhibit multiple, irregularly arrayed tiers of film material wherein two or more internal, partial sub-levels of film material can be observed. The tiers or sub-levels are substantially randomly distributed, and include an irregular, substantially random array of internal pores formed to extend through each tier (e.g. FIG. 14). The films of the present invention are substantially free of generally tubular pores with voids aligned in a generally regular pattern array to provide a plurality of generally collinear groupings of the voids.

In other aspects of the invention, the porous film of the invention can include pores which are bounded by tensile-stressed, elongated pore walls composed of film material which has undergone a selected amount of plastic, stretch-deformation. The stressed regions can, for example, be observed at least along boundary edges of the extended, surface voids present on the exposed, outermost surface of the film.

Suitable techniques for obtaining the data for determining the various mechanical properties and pore characteristics of the film are further described in the Test Procedures section, set forth below.

Testing Procedures

Mechanical Properties

A suitable technique for determining the mechanical properties of the porous film 20 can employ a Sintech tensile tester (SINTECH 1/D) and Testworks 3.03 software. The tensile tester is a device available from MTS System Co., a business having offices located in Cary, N.C. 27513. The software is available from MTS System Co., Sintech Division, a business having offices located in Cary, N.C. 27513. Equipment and software having substantially equivalent capabilities may also be employed.

Mechanical properties can be evaluated with the tensile tester using its strip-testing configuration. The testing is conducted with a 25 pound (110 N) load cell, and air actuated, rubber coated 3 inch (7.6 cm) grips. The film testing is conducted with a 2 inch (5.08 cm) gauge length and a 5 inch/min (12.7 cm/min) cross-head speed. An individual film sample is loaded perpendicular to and in the center of the grips, and is held in place when air pressure closes the grips together. The thickness of the film is inputted by the user before beginning the tensile testing. In each experiment, the film is stretched until breakage occurs, and the equipment software or other equipment programming creates a stress-versus-strain plot and calculates the desired mechanical properties for the sample. The mechanical properties can include, for example, Young's modulus, tensile stress at break, and percent strain (% strain) or elongation-at-break.

Dynamic Contact Angle Measurement

The images of individual, 3-microliter drops were recorded with a high speed video system, such as a NAC HSV 1000 motion analysis system, which is available from Eastman Kodak Company, Motion Analysis Division, a business located in 11633 Sorrento Valley Road, San Diego, Calif. 92121-1097. The system can provide a time expansion of up to 30 times and has a long record time. The camera is set up so its sensor is square to the drop, and level in relation to the surface onto which the drop is placed. The image size is set to cover 50% to 75% of the sensor width. The stage is suitably lit to give a good image of the droplet; generally a high degree of back lighting is appropriate. At least three drops were analyzed for each material. Each drop had a volume of approximately 3 micro-liters. The tested films were about several months old, and no surface cleaning or surface preparation was applied. Strips of the film specimens measuring 6 mm×25 mm (width×length) were cut from the film samples and taped to a glass slide. The glass slide with the film specimen was placed on the stage, and a jack mechanism was used to adjust the height of the stage for suitable viewing.

The recording is started and the drop is set on the surface of the material being tested. The recording is terminated after a specified time of 12 sec, or after the drop has been absorbed into or spread across the surface, whichever is less. The video system allows an analysis of the drop dynamics on the surface of the test sample. After the video recordings have been completed, the video tapes are time coded.

The quantitative analysis is done using suitable motion analysis software, such as Concurrent Processing's MAP motion analysis software package, which is available from Concurrent Processing Inc., a business having offices in 2984 Iroquois, Detroit, Mich. 48214-1838. By viewing a stop-image of the motion of the drop displayed on the video monitor, the left and right contact angles, as well as the width and height of the drop, can be determined by plotting six line segments. The mean values for the left and right contact angles are reported for the elapsed time (ET) from zero seconds to ten seconds.

Figure 17:
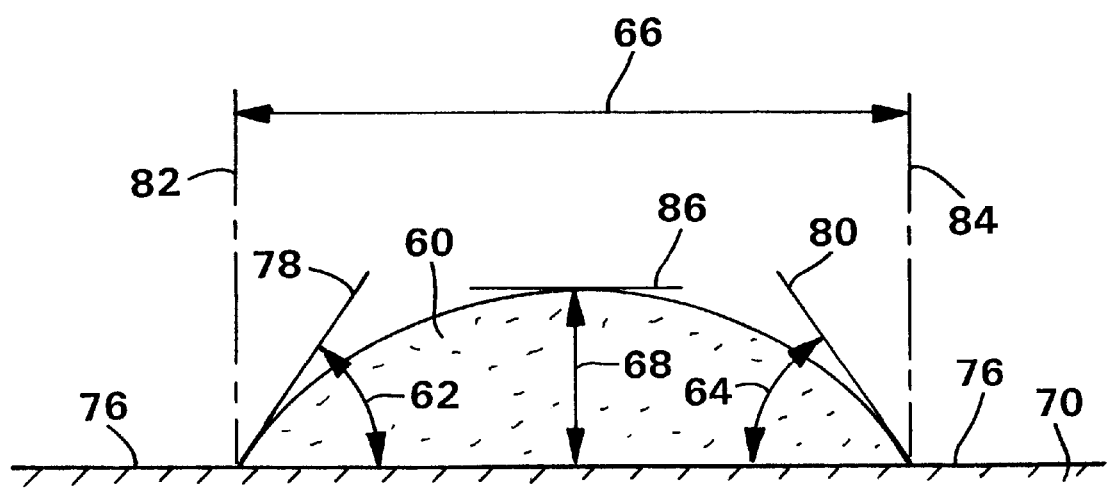
FIG. 17 shows a schematic side view of a liquid drop lying in contact with a surface of a material.

The contact angle for the specimen material is determined by "freezing" or otherwise stopping the action of the recorded image the drop on a suitable monitor, and plotting the six line segments along the perimeter of the drop. The intersection of two particular segment lines determines right and left contact angles. With reference to FIG. 17, a representative drop 60 is illustrated lying in contact with the surface of the selected test material 70. The left contact angle 62 can be determined from the line segments 76 and 78, where the line segment 76 is aligned with the surface of the test material and the segment 78 is substantially tangential to the liquid surface at the point of intersection with the test material. The right contact angle 64 can be determined from the line segments 76 and 80 where the line segment 80 is substantially tangential to the liquid surface at the point of intersection with the test material. The width 66 can be determined from the line segments 82 and 84, and the height 68 can be determined from the line segments 76 and 86.

The software can do all the calculations including the scaled length. The contact angle for the individual drop is reported as an average of left and right contact angles. About three drops are analyzed to generate the final mean value for the specimen which is calculated as an average value for the three drops.

Surface Microprofilometry Analysis

The surface microtopography of stretched films was evaluated by stylus profilometry using the RANK-TAYLOR TALYSURF profilometer. Samples were mounted on a glass slide, and the profilometer was set to collect an approximately 0.3 mm×0.3 mm area scan generated by 256 traces, spaced 1.17 microns apart. The diamond stylus tip was used. The resultant map files were reconstructed using FORM TALYSURF software on an APPLE QUADRA 650 computer. A three-dimensional (3D) axonimetric projection was created, and a randomly chosen single line trace was extracted from the elevation data for each film sample to compare the profiles.

Breathability

The water vapor transmission rate (WVTR) values for the film materials was calculated in accordance with ASTM Standard E96-80. Circular samples measuring three inches in diameter were cut from each of the test materials and a control which was a available from Hoechst Celanese Corporation. An individual samples of the test materials and a control material were placed across the open tops of the individual vapometer cups containing one hundred milliliters of distilled water. The screw-on flanges were tightened to form a seal along the edges of the cup. The cups were placed in a confection type oven at 100° F. The relative humidity within the oven was not specifically controlled. The caps were weighted and immediately placed into oven. After 24 hours, the cups were removed from the oven and weighed again. The WVTR of each material was calculated based on the weight loss and WVTR of the control film, assuming the WVTR of the CELGARD® 2500 microporous film to be 5000 g/sq.m/24 h under predetermined set conditions. A specific water-vapor transmission rate per 1 mil was calculated by multiplying a measured WVTR on the film thickness.

Water Uptake Measurement

Water uptake was studied using the CAHN DCA 322 microbalance system which includes a movable stage. The balance is sensitive to force changes as little as 0.1 micrograms and is equipped with two weighting positions, loop A and loop B, and a tare position, loop C. The loop A has better sensitivity while loop B can support a larger load. All film testing was done on loop B of the balance. Each film specimen was cut in a form of a narrow strip 10 mm long and 2 mm width. The film strip was glued to a thin, nozzle cleaning wire, of 0.014 diameter. During the test, the film specimen is immersed for 8 mm into distilled water, the stage is stopped, the sample remains in the water for 60 seconds as software collects force readings, and the specimen is pulled back out of the water.

The CAHN system includes a movable stage which can be translated at a steady rate up and down. The test sample is hung from or otherwise mounted onto the selected loop of the balance, and a beaker of water is placed on the moveable stage. The stage is brought up so that the lower edge of the sample is just above the water surface, and the test is begun. Software, which is provided with the CAHN system, controls the experiment in accordance with parameters which are input by the user. For the film testing, the test sample is installed on the balance, and the balance is tared just when the film specimen touches the surface of water.

The weight gain during 1 minute soak in water is measured and attributed to water uptake of the specimen. To determine water-uptake rate, the weight gain is divided on the duration of time of 60 sec. To determine specific water uptake at the end of 1 minute soak, the weight gain is normalized to the film-specimen weight before immersion in water.

In particular, the system software is instructed to collect force readings at one second intervals. An 8 mm length of the exposed portion of the test sample is immersed into the water, and the stage is stopped. The test sample is left in the water for 1 minute as the software collects force readings at the one second intervals. The test sample is then pulled back out of the water.

The data collected from an experiment can then be evaluated. In particular, the data can be exported into suitable spreadsheet software, such as MICROSOFT EXCEL Version 5.0, and processed to generate a plot of weight versus time for the 1 minute soak in the water. An example of a representative plot is shown in FIG. 18. The plot shows the trend of water uptake for the test sample, and provides a convenient basis for comparing the relative water uptake performance and the relative levels of water accessibility of different film samples. The water uptake amount listed in the examples was calculated by taking the total weight gain recorded at the 1 minute (60 sec) time of measurement in the data plot, and dividing the total weight gain by the dry weight of the film-specimen before its immersion in water.

It should be noted that the measured and recorded weight gain may include a weight gain due to the water absorbed into the initial porous structure, as well as weight gains due to other interactions between the film and water. For example, a coating layer of water can form on the film. In addition, the film structure can swell to provide pores with increased void volume, or the film can otherwise change in configuration to provide an increased capacity for acquiring and holding absorbed water. Accordingly, the measured data on water uptake should not be interpreted as an absolute measurement of the water absorption potential of the film. The data can, however, provide a basis for relative comparisons of the water-uptake ability exhibited by different film materials.

Where the film is highly hydrophobic with a contact angle of approximately 90 degrees (e.g., Examples 9 and 11), the film sample may not become immersed into the water when employing the above-described procedure because of the strong repulsive force between the water and the film sample. Accordingly, the water uptake will not be reported for such samples.

Scanning Electron Microscopy and Image Analysis

Electron photomicrographs can be generated by conventional techniques which are well known in the imaging art. In addition, the samples can be prepared for the desired imaging by employing well known, conventional preparation techniques.

Since the porous film of the invention can be very ductile even at low temperatures, it is important to avoid an excessive smearing of the film material when the film sample is being cut and prepared for an imaging of the film cross-section. In a suitable preparation technique, the samples can, for example, be submerged in ethanol for 1 hour and then plunged into liquid nitrogen. For the film cross-sections, the surfaces can be prepared by cryomicrotomy, such as by using a Reichert Ultracut S microtome with an FCS cryo-sectioning system (Leica, Deerfield, Ill.), in which a fresh 6 mm glass knife at temperatures of −180° C. is used. The resulting film can then be mounted on an appropriate stub and coated with gold or Au/Pd (gold/palladium). The film microstructure can be imaged by scanning electron microscopy, such as by using a JSM 6400 (JEOL, Peabody, Mass.) scanning electron microscope with both secondary and backscatter electron detectors.

Automated image analyses of voids and film pores can be conducted by well known, conventional techniques. Examples of such techniques are described in "APPLICATION OF AUTOMATED ELECRON MICROSCOPY TO INDIVIDUAL PARTICLE ANALYSIS" by Mark S. Germani, *AMERICAN LABORATORY,* published by International Scientific Communications, Inc.; and in "INTRODUCTION TO AUTOMATED PARTICLE ANALYSIS" by T. B. Vander Wood (copyright 1994, MVA, Inc., 550 Oakbrook Parkway #200, Norcross, Ga. 30093), *Proc. 52nd Annual Meeting of the Microscopy Society of America,* G. W. Bailey and A. J. Garratt-Reed, Eds., published by San Francisco Press. During the course of the image analyses, the image of the porous structure can be digitized employing conventional techniques.

For example, the imaging of the cross-section surfaces can be performed with a JEOL 6400 SEM at 8 kilovolts accelerating voltage. Eight-bit digital images can be acquired at 4,000 X for image processing. The images can be binarized using a conventional best-fit greylevel thresholding to define the pores. To prevent dark pixels in shadowed areas from being interpreted as pores, a 2-pass dilation (plating) routine followed by a 2-pass erosion step was done. Stray dark pixels are eliminated by this routine without affecting the original dimensions of the pores.

The following Examples are to provide a more detailed understanding of the invention. The examples are representative and are not intended to specifically limit the scope of the invention.

EXAMPLE 1

A $CaCO_3$ particulate filler material (SUPERMITE from ECC International) was modified with 6 wt % (based on the weight of the filler material) of DOW CORNING 193 silicone glycol surfactant (Dow Corning Corporation). The resultant treated and modified filler material was intermixed with a resin composed of an ethylene-octene-1 copolymer (DOWLEX NG 3347A supplied by Dow Plastics) by using a FARREL high shear mixer (Heritage Plastics Inc.). The $CaCO_3$ mean particle size was about 1 micron, and the concentration of $CaCO_3$ was 43.4 wt % (based on the total weight of the resin, filler, and surfactant) as measured by the ashes analysis. The DOW CORNING 193 silicone glycol surfactant had a HLB number of 12.2. The film material was cast using a laboratory HAAKE twin screw extruder operating at 60 rpm, with a 4" film die at a temperature of 185° C., and with chill rolls. The cast film had a thickness of about 10 mil. The film then was stretched at 60° C. in air by a factor of 3.5 X in its machine direction (MD) and by a factor of 2.5 X in its transverse direction (TD) sequentially using a T. M. Long film stretcher. After the release of the film from the stretcher, the area stretch ratio of the relaxed film was measured. The measured stretch ratio was 2.8 X in its MD and 2 X in its TD (area stretch 5.6 X). The mechanical properties of the stretched film were measured with a SINTECH tensile tester in both the MD and TD. (Table 1) The surface microtopography of the film sample was evaluated by stylus profilometry. The microporous structure of the film sample was analyzed by SEM, and the water accessibility was measured using a CAHN DCA 322 microbalance (Table 1). The water vapor transmission rate (WVTR) was measured by the cup method (Table 1), and the contact angle with distilled water was measured using an image analysis of a high speed video recording of water micro-drops on the surface of the film sample. (Table 1).

EXAMPLE 2

Particles of $CaCO_3$ (SUPERMITE from ECC International) filler material were surface-modified with DOW CORNING 193 silicone glycol surfactant (Dow Corning Corporation) in an acetone-surfactant solution. The surfactant content was 6 wt % based on the weight of the filler, as determined by thermal gravimetric analyses (TGA). The modified filler particles were intermixed with a resin composed of an ethylene-octene-1 copolymer (DOWLEX NG 3347A supplied by Dow Plastics) by extruding the combined materials twice through a laboratory HAAKE twin screw extruder. The concentration of $CaCO_3$ was 38.2 wt % (based on the total weight of the resin, filler, and surfactant) as measured by the ashes analysis. The film material of the example was cast using a laboratory Haake twin screw extruder operating at 60 rpm, with a 4" film die at temperature 185° C., and with chill rolls. The cast film had a thickness of about 10 mil. The film was then stretched at 60° C. in air by a factor of 3.5 X in its machine direction (MD) and by a factor of 2.5 X in its transverse direction (TD) sequentially using a T. M. Long film stretcher. The stretch ratio of the relaxed film was measured as of 2.28 X in the MD and 1.97 in the TD. The mechanical properties of the stretched film were measured in the MD and TD, as well as water uptake rate and water uptake amount, and are summarized in the Table 1.

EXAMPLE 3

Particles of $CaCO_3$ (SUPERMITE® from ECC International) filler material were modified by a coating treatment with 6 wt % (based on the weight of the filler) of DOW CORNING 193 silicone glycol surfactant (Dow Corning Corporation). The modified filler particles were intermixed with a resin composed of an ethylene-octene-1 copolymer (DOWLEX NG 3347A supplied by Dow Plastics) by using a FARREL high shear mixer (Heritage Plastics Inc.). The concentration of $CaCO_3$ was 43.4 wt % (based on the total weight of the resin, filler, and surfactant) as measured by the ashes analysis. A blown film of 1 mil thick was produced from the resultant film material composition. The surface microtopography, mechanical properties in both its MD and TD, as well as the contact angle with distilled water, and WVTR were measured for this film (Table 1).

EXAMPLE 4

Particles of $CaCO_3$ (SUPERMITE from ECC International) filler material were modified by a coating treatment with 6 wt % (based on the weight of the filler) of DOW CORNING 193 silicone glycol surfactant (Dow Corning Corporation). The modified filler particles were intermixed with a resin composed of an ethylene-octene-1 copolymer (DOWLEX NG 3347A supplied by Dow Plastics) by employing a FARREL high shear mixer (Heritage Plastics Inc.). The concentration of $CaCO_3$ was 43.4 wt % (based on the total weight of the resin, filler, and surfactant) as measured by the ashes analysis. The film material was cast using a laboratory HAAKE twin screw extruder operating at 60 rpm, with a 4" film die at temperature 185° C., and with chill rolls. The cast film had a thickness of about 10 mil. The film was then stretched at 60° C. in air by a factor of 3.5 X in its machine direction (MD) and by 2.5 X in its transverse direction (TD) simultaneously using T. M. Long film stretcher. The stretch ratio of the relaxed film was measured as of 3.3 X in the MD and 1.95 X in the TD. The tensile properties of this film in MD and TD, as well as WVTR, and the contact angle were measured for this film and are summarized in Table 1.

EXAMPLE 5

A resin composed of an ethylene-octene-1 copolymer (DOWLEX NG 3347A supplied by Dow Plastics) was intermixed with particles of $CaCO_3$ (SUPERMITE from ECC International) filler material. The concentration of the $CaCO_3$ was 50 wt % (based on the total weight of the resin and filler). The blown film of 1 mil thick was produced from the above composition. The tensile properties of this film in the MD and the TD, as well as the water uptake performance and the water contact angle were measured for this film and are summarized in Table 1.

EXAMPLE 6

Particles of $CaCO_3$ (SUPERMITE from ECC International) filler material were modified by treatment with 6 wt % (based on the weight of the filler) of DOW CORNING 193 silicone glycol surfactant (Dow Corning Corporation). The modified filler particles were intermixed with a resin composed of an ethylene-octene-1 copolymer (DOWLEX NG 3347A supplied by Dow Plastics) by using a FARREL high shear mixer (Heritage Plastics Inc.). The concentration of the $CaCO_3$ was 43.4 wt % (based on the total weight of the resin, filler, and surfactant) as measured by the ashes analysis. The film material was cast using a laboratory HAAKE twin screw extruder operating at 60 rpm, with a 4" film die at temperature 185° C., and with chill rolls. The cast film had a thickness of about 10 mil. The film was then stretched at 60° C. in air by a factor of 3.5 X in its MD using a T. M. Long film stretcher. The stretch ratio of the relaxed film was measured as of 3.03 X in the MD and 0.98 X in its TD. The contact angle and water uptake were measured for this film, as well as tensile properties in MD, and are summarized in Table 1.

EXAMPLE 7

Particles of $CaCO_3$ (SUPERMITE from ECC International) filler material were modified by treatment with 6 wt % (based on the weight of the filler) of DOW CORNING 193 silicone glycol surfactant (Dow Corning Corporation). The modified filler particles were intermixed with a resin composed of an ethylene-octene-1 copolymer (DOWLEX NG 3347A supplied by Dow Plastics) by using a FARREL high shear mixer (Heritage Plastics Inc.). The concentration of the $CaCO_3$ was 43.4 wt % (based on the total weight of the resin, filler, and surfactant) as measured by the ashes analysis. The film was cast using a laboratory HAAKE twin screw extruder operating at 60 rpm, 4" film die at temperature 185° C., and the chill rolls. The cast film has a thickness of about 10 mil. The film then was stretched at RT in air by 4.5 X in MD using a SINTECH tensile tester. The contact angle and water uptake have been measured for this film, as well as tensile properties in MD, and are summarized in Table 1.

EXAMPLE 8

Particles of $CaCO_3$ (SUPERMITE from ECC International) filler material were modified by treatment with 6 wt % (based on the weight of the filler) of IGEPAL RC 630 surfactant (Rhone-Poulenk INC.). The modified filler particles were intermixed with a resin composed of an ethylene-octene-1 copolymer (DOWLEX NG 3347A supplied by Dow Plastics) by extruding the combined materials twice through a laboratory HAAKE twin screw extruder. The concentration of $CaCO_3$ was about 45 wt % (based on the total weight of the resin, filler, and surfactant). The IGEPAL RC 630 surfactant had a HLB number of 12.7. The film was cast using a laboratory HAAKE twin screw extruder operating at 60 rpm, with a 4" film die at temperature 185° C., and with chill rolls. The cast film had a thickness of about 10 mil. The film was then stretched at room temperature in air by a factor of 4.5 X in its MD using a SINTECH tensile tester. The water contact angle and water uptake data, as well as the tensile properties in the MD, were measured for this film and are summarized in Table 1.

EXAMPLE 9

This sample was composed of commercially available microporous polypropylene film, CELGARD 2500, having gauge of 1 mil and available from Hoechst Celanese Corporation, a business having offices located in Charlotte, N.C. The properties of the film were measured and are summarized in the Table 1.

EXAMPLE 10

This sample was composed of commercially available microporous polypropylene film, CELGARD 2500, obtained from Hoechst Celanese Corporation. The microporous film had a gauge of 1 mil, and was surfactant modified by immersing in a solution of 10 wt % hydrophilic silicon glycol (DOW CORNING 193) surfactant in acetone for 1 hour and drying at 50° C. for 6 hours before testing. The water uptake of the modified microporous film has been measured, as well as tensile properties, and are summarized in Table 1.

EXAMPLE 11

This sample was composed of semi-commercially available (pilot plant production) biaxially stretched filled polyolefin film, received from Mitsubishi Petrochemical Co., LTD., a business having offices in Tokyo, Japan. The concentration of $CaCO_3$ in the film was 60 wt %. The properties of the film were obtained from a second source and are summarized in Table 1.

EXAMPLE 12

This sample was composed of commercially available stretched filled polyolefin film, available from KAO Corp., a business having offices in Japan. The concentration of $CaCO_3$ in this film was 54 wt %. The properties of the film were obtained from a second source and are summarized in Table 1.

stretched films, of the present invention can provide a distinctive surface-open interconnected porous morphology, and can provide a well-developed surface microtopography which can improve the tactile properties of the film.

Having thus described the invention in rather full detail, it will be readily apparent that various changes and modifications can be made without departing from the spirit of the invention. All of such changes and modifications are contemplated as being within the scope of the invention, as defined by the subjoined claims.

We claim:

1. A wettable porous film comprising a polymer film material having a porous morphology; said film providing for a WVTR value of at least about 1000 grams per square meter per 24 hours per mil of film thickness, a Young's modulus of not less than about 1 MPa, a water contact angle of not more than about 80 degrees, an elongation-at-break value of not less than about 100% with respect to a first major direction of said film, and an elongation-at-break value of not less than about 100% with respect to a second major direction of said film; wherein said second direction is aligned substantially perpendicular to said first direction, and said porous film has been produced from a precursor film layer which is sufficiently hydrophilic to provide a water contact angle of not more than about 37 degrees.

2. A porous film as recited in claim 1, wherein said film provides a first tensile strength value of not less than about 6 MPa with respect to a first major direction of said film.

TABLE 1

|  | Units | Ex. #1 | Ex. #2 | Ex. #3 | Ex. #4 | Ex. #5 | Ex. #6 | Ex. #7 | Ex. #8 | Ex. #9 | Ex. #10 | Ex. #11 | Ex. #12 |
|---|---|---|---|---|---|---|---|---|---|---|---|---|---|
| Gauge | mil | 4 | 6 | 1 | 4 | 1.2 | 7 | 3 | 3 | 1 | 1 | 2.7 | 1.26 |
| Tensile Strength | MPa | | | | | | | | | | | | |
| MD | | 17 | 24 | 31 | 19.4 | 19.7 | 21.5 | 48.6 | 52.2 | 81.3 | 93.4 | 12.5 | 20 |
| TD | | 22.5 | 18 | 22 | 13.1 | 13.6 | | | | 16.1 | | 7.45 | 6.2 |
| Elongation | % | | | | | | | | | | | | |
| MD | | 177 | 307 | 376 | 130 | 360 | 148 | 44 | 50.4 | 44.3 | 66.7 | 120 | 290 |
| TD | | 178 | 384 | 531 | 326 | 666 | | | | 405 | | 85 | 560 |
| Modulus | MPa | | | | | | | | | | | | |
| MD | | 36.8 | 18.2 | 46.8 | 36.1 | 311.5 | 48.3 | 184 | 193.7 | 670.8 | 623.6 | 78.6 | 99.97 |
| TD | | 30.9 | 14.6 | | 6.1 | 253.9 | | | | 384.3 | | 58.6 | |
| WVTR | g/sq. m/24 h/mil | 16,000 | | 70.2 | 16,860 | | | | | 5000 | | 10,800 | 6048 |
| Contact angle | deg | | | | | | | | | | | | |
| ET = 0 sec | | 68.2 | | 36.2 | 67.8 | 87 | 47.4 | 71.3 | 69.5 | 90 | | >90 | |
| ET = 10 sec | | 58.4 | | <6 | 56.5 | 82.5 | 32.6 | 22 | 39.6 | | | | |
| Water uptake rate | mg/sec | 0.1 | 0.11 | 0.018 | 0.074 | 0.002 | 0.036 | 0.13 | 0.095 | | 0.008 | | |
| Water uptake | mg/mg | 2.28 | 1.54 | 0.86 | 1.78 | 0.077 | 0.55 | 1.97 | 1.57 | | 0.72 | | |

The comparative data shown in Table 1 indicate that the hydrophilic, porous films of the invention, particularly the biaxially stretched microporous films (e.g. Examples 1, 2, and 4) can demonstrate superior balance between mechanical performance and functional properties, as compared to conventional films known in the prior art (e.g. Examples #5, 9, 10, 11, and 12). The films can provide more balanced tensile properties in both the machine and transverse directions, can provide a low modulus, such as a modulus of not more than 40 MPa, and as a result, can exhibit high flexibility. The films of the invention can exhibit an improved specific breathability, such as a water vapor transmission rate which is in the range of about 16,000 g/sq.m/24 h/mil, can exhibit improved wettability, such as contact angles below 70 deg. The films can also exhibit improved water uptake potential in the range 1.5–2 mg/mg. In addition, the stretched films, particularly the biaxially 3. A porous film as recited in claim 2, wherein said film provides a second tensile strength value of not less than about 6 MPa with respect to a second major direction of said film, said second direction aligned substantially perpendicular to said first direction.

4. A porous film as recited in claim 1, wherein said film provides a WVTR value of not less than about 2000 grams per square meter per 24 hours per mil of film thickness.

5. A porous film as recited in claim 1, wherein said film provides a Young's modulus of not less than about 5 MPa.

6. A porous film as recited in claim 1, wherein said film provides a water contact angle of not more than about 75 degrees.

7. A porous polymer film as recited in claim 1, wherein said porous morphology includes a lattice of said polymer material which delimits a plurality of voids having pore sizes which include a major axis length which is at least about 0.05 μm.

8. A porous polymer film as recited in claim 1, wherein said porous morphology includes a lattice of said polymer material which delimits a plurality of voids having pore sizes which include a major axis length which is at least about 0.2 μm.

9. A porous polymer film as recited in claim 8, wherein a major facing surface of said film has an average surface-open pore area of not less than about 5% of the surface area of said major facing surface.

10. A porous polymer film as recited in claim 1, wherein said film exhibits a surface-open porous morphology which includes a plurality of pores distributed through a thickness dimension of said film.

11. A porous polymer film as recited in claim 1, wherein said porous morphology includes a lattice of said polymer material which delimits a plurality of voids which open onto a major facing surface of said film.

12. A porous polymer film as recited in claim 1, wherein a cross-section through a thickness dimension of said polymer material exhibits a lattice having a cellular configuration.

13. A porous polymer film as recited in claim 1, wherein said film material includes a generally random, irregularly connected network having a multiplicity of ligaments of film material which extend through and span across void spaces to interconnect with other segments of said film material.

14. A porous polymer film as recited in claim 13, wherein said ligaments provide a contiguous, three-dimensional, spidery array.

15. A porous polymer film as recited in claim 1, wherein said film has an average surface roughness value of not more than 1 micrometer, and a peak roughness height of not more than about 5 micrometer.

16. A porous polymer film as recited in claim 1, wherein said polymer material includes a linear low density polyethylene (LLDPE) material.

17. A porous film as recited in claim 1, wherein said porous film has an elongation-at-break value of not less than about 150% with respect to said first major direction of said film, and an elongation-at-break value of not less than about 150% with respect to said second major direction of said film.

18. A wettable porous film comprising a polymer film material having a porous morphology; said film providing for a WVTR value of at least about 1000 grams per square meter per 24 hours per mil of film thickness, a Young's modulus of not less than about 1 MPa, a water contact angle of not more than about 80 degrees, an elongation-at-break value of not less than about 30% with respect to a first major direction of said film, and an elongation-at-break value of not less than about 30% with respect to a second major direction of said film; said second direction aligned substantially perpendicular to said first direction; and said porous film produced from a precursor layer which is sufficiently hydrophilic to provide a precursor layer water contact angle of not more than 37 degrees.

19. A wettable porous film comprising a polymer film material having a porous morphology; said film providing for a WVTR value of at least about 1000 grams per square meter per 24 hours per mil of film thickness, a Young's modulus of not less than about 1 MPa, a water contact angle of not more than about 80 degrees, an elongation-at-break value of not less than about 30% with respect to a first major direction of said film, and an elongation-at-break value of not less than about 30% with respect to a second major direction of said film; wherein said second direction is aligned substantially perpendicular to said first direction; said porous film is water accessible with a water uptake rate of not less than about 0.01 mg/sec, and said porous film is produced from a precursor layer which is sufficiently hydrophilic to provide a precursor layer water contact angle of not more than about 37 degrees.

20. A porous film as recited in claim 19, wherein said porous film has an elongation-at-break value of not less than about 100% with respect to said first major direction of said film, and an elongation-at-break value of not less than about 100% with respect to said second major direction of said film.

21. A porous film as recited in claim 19, wherein said porous film has an elongation-at-break value of not less than about 150% with respect to said first major direction of said film, and an elongation-at-break value of not less than about 150% with respect to said second major direction of said film.

22. A porous film as recited in claim 19, wherein said porous film has a water uptake rate of not less than about 0.03 mg/sec.

23. A porous film as recited in claim 19, wherein said porous film has a water uptake rate of not less than about 0.06 mg/sec.

24. A wettable porous film comprising a polymer film material having a porous morphology; said film providing for a WVTR value of at least about 1000 grams per square meter per 24 hours per mil of film thickness, a Young's modulus of not less than about 1 MPa, a water contact angle of not more than about 80 degrees, an elongation-at-break value of not less than about 100% with respect to a first major direction of said film, and an elongation-at-break value of not less than about 100% with respect to a second major direction of said film; wherein said second direction is aligned substantially perpendicular to said first direction, and said film has been produced from a source material which contains filler particles which carry a hydrophilic surfactant.

25. A porous film as recited in claim 24, wherein said filler particles have a weight, and an amount of said surfactant is not less than about 3 wt % of the filler particle weight.

* * * * *